(12) United States Patent
Flinn et al.

(10) Patent No.: US 9,252,903 B2
(45) Date of Patent: Feb. 2, 2016

(54) SYSTEM AND METHOD FOR ACCOUNTING FOR TIME THAT A PACKET SPENDS IN TRANSIT THROUGH A TRANSPARENT CLOCK

(75) Inventors: Jasson Flinn, Ottawa (CA); Juan-Carlos Calderon, Fremont, CA (US); Jean-Michel Caia, Plymouth, CA (US); Arun Zarabi, Sacramento, CA (US); Scott Feller, Mountain View, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 776 days.

(21) Appl. No.: 13/279,043

(22) Filed: Oct. 21, 2011

(65) Prior Publication Data

US 2013/0100832 A1    Apr. 25, 2013

(51) Int. Cl.
*H04J 3/06* (2006.01)
*H04L 12/26* (2006.01)

(52) U.S. Cl.
CPC ............. *H04J 3/0667* (2013.01); *H04J 3/0673* (2013.01); *H04L 43/0852* (2013.01); *H04L 43/106* (2013.01)

(58) Field of Classification Search
CPC .......................................................... G06F 1/12
USPC ................................................ 370/503, 252
See application file for complete search history.

(56) References Cited

U.S. PATENT DOCUMENTS

| | | | |
|---|---|---|---|
| 5,793,976 A * | 8/1998 | Chen et al. ..................... | 709/224 |
| 7,778,283 B2 * | 8/2010 | Eidson .......................... | 370/503 |
| 7,788,283 B2 * | 8/2010 | Wakeam et al. ............... | 707/798 |
| 8,081,663 B2 * | 12/2011 | Tamura ......................... | 370/503 |
| 8,416,763 B1 * | 4/2013 | Montini et al. ............... | 370/350 |
| 2005/0078682 A1 * | 4/2005 | Kim et al. .................... | 370/395.5 |
| 2005/0091396 A1 * | 4/2005 | Nilakantan et al. ........... | 709/232 |
| 2006/0203729 A1 * | 9/2006 | Deshpande ................... | 370/235 |
| 2008/0069150 A1 * | 3/2008 | Badt et al. .................... | 370/503 |
| 2009/0190613 A1 * | 7/2009 | Finn .............................. | 370/509 |
| 2013/0070630 A1 * | 3/2013 | Huang et al. ................. | 370/252 |

OTHER PUBLICATIONS

IEEE Instrumentation and Measurement Society. IEEE Standard for a Precision Clock Synchronization Protocol for Networked Measurement and Control Systems. New York: IEEE, 2008.
S. Mohl, Dirk. IEEE1588. Retrieved on Jun. 7, 2011 from http://www.ieee1588.com/.
Micrel, Inc. Micrel 1588 PTP Developer Guide. Retrieved on Sep. 22, 2011 from ftp://www.micrel.com/ethernet/8463/Micrel_1588_PTP_Dev_Guide.pdf.

* cited by examiner

*Primary Examiner* — Robert M Morlan
(74) *Attorney, Agent, or Firm* — Amin, Turocy & Watson, LLP

(57) ABSTRACT

Despite a recent revision, IEEE 1588™-2008 does not provide a complete implementation for PTP (precision time protocol) that accounts for variable delays introduced by network components. According to a broad aspect, the present disclosure provides implementations that account for variable delays introduced by network components. Therefore, the amount of time that a packet spends in transit through a transparent clock can be accounted for. According to another broad aspect, there is provided a master-slave mode that allows a transparent clock to function as a master or a slave to another clock.

21 Claims, 9 Drawing Sheets

SYSTEM AND METHOD FOR ACCOUNTING FOR TIME THAT A PACKET SPENDS IN TRANSIT THROUGH A TRANSPARENT CLOCK

FIELD OF THE DISCLOSURE

The application relates to clocks, and more particularly to synchronising clocks over a network.

BACKGROUND

There are several different technologies that may rely on accurate synchronisation of clocks for proper operation. For example, TDD (time division duplex) in a cellular network is a radio technology that may rely on alignment between clocks of adjacent base stations in the cellular network. CDMA (Code Division Multiple Access) is an example of such radio technology.

There are existing approaches to synchronising clocks over a network. One approach is NTP (Network Time Protocol), which is a protocol for synchronising clocks of computer systems over packet-switched networks. However, in some applications the accuracy achieved using NTP is inadequate.

An alternative approach that offers greater accuracy than NTP is GPS (Global Positioning System) technology. By using GPS technology, each clock can receive timing information based on signals received from satellites orbiting the Earth. Thus, GPS technology can enable accurate synchronisation of clocks in a manner that bypasses any need for signalling through a network.

Unfortunately, in order to use GPS technology for synchronising clocks, a GPS receiver may be implemented with each clock. The cost involved in having the GPS receivers can be significant, especially if there are several clocks to be synchronised. Moreover, if any clocks are located where there is no line of sight to receive the signals from the satellites, then the GPS technology may not even be a workable solution.

Another approach is PTP (Precision Time Protocol) as recently revised in IEEE 1588™-2008[1]. By using this revision of PTP, it may be possible to synchronise distributed clocks with an accuracy of less than one microsecond via Ethernet networks.

[1] IEEE Instrumentation and Measurement Society. *IEEE Standard for a Precision Clock Synchronization Protocol for Networked Measurement and Control Systems*. New York: IEEE, 2008

BRIEF DESCRIPTION OF THE DRAWINGS

Embodiments of the disclosure will now be described with reference to the attached drawings in which.

DETAILED DESCRIPTION OF EMBODIMENTS

Figure 1:
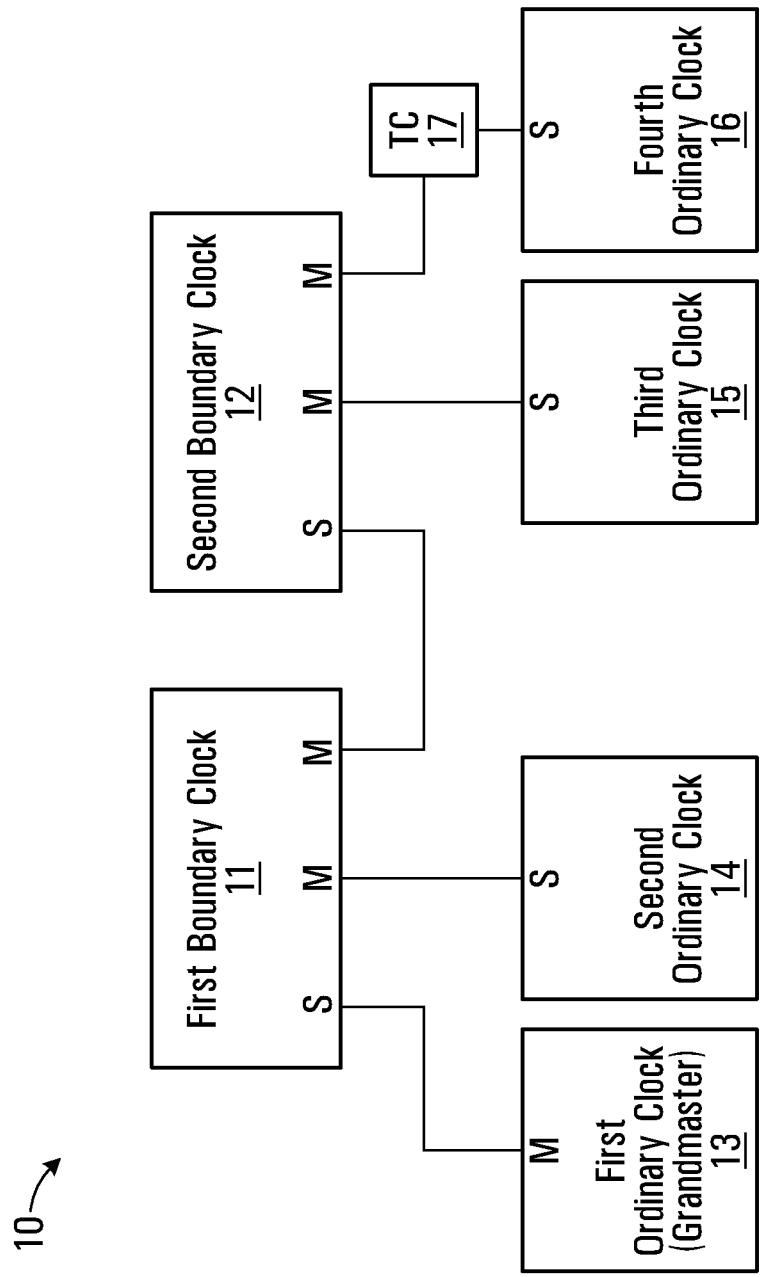
FIG. 1 is a block diagram of a timing system in a master-slave hierarchy.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Despite a recent revision, IEEE 1588-2008 does not provide a complete implementation for PTP that accounts for variable delays introduced by network components such as switches and routers. If the variable delays are not accounted for, then there may be inaccuracies when synchronising clocks over a network. According to a broad aspect, the present disclosure provides implementations that account for variable delays introduced by network components. Therefore, the aforementioned inaccuracies might be reduced or avoided altogether.

An example device addresses the variable delay problem by accounting for time that a packet spends in transit through a network component. In some implementations, the device forms part of a transparent clock, which includes the network component introducing variable delay. First, the device notes an arrival time of the packet at the transparent clock. Next, the device writes the arrival time into a portion of the packet. This information is retained as the packet moves through the network component. When the packet exits the transparent clock, the device determines a departure time for the packet. Now the device can provide timing adjustment information compensating for the time difference between the entry and exit of the packet through the transparent clock.

In some implementations, the timing adjustment information is provided with the packet. In other implementations, the timing adjustment information is provided in a follow-up packet. For such implementations, the transparent clock might use a unique ID in order to reconcile the follow-up packet with the packet that already transited the transparent clock. This can help to avoid a situation in which there is a mix-up with signalling for example due to the network component dropping a packet.

According to another broad aspect, there is provided a master-slave mode that allows a transparent clock to function as a master or a slave to another clock. The transparent clock internally generates packets for synchronisation purposes in a manner that distinguishes them from other transiting packets. Thus, the transparent clock can use the same communication path used for the transiting packets.

Other aspects and features of the present disclosure will become apparent, to those of ordinary skill, upon review of the following description of the specific embodiments of the disclosure.

Introduction to Time Synchronisation

Referring now to FIG. 1, shown is a block diagram of a timing system 10 in a master-slave hierarchy. The timing system 10 has a first boundary clock 11 coupled to a second boundary clock 12. Each boundary clock 11,12 is a multiple port device having three ports in this example. The first boundary clock 11 is also coupled to a first ordinary clock 13 and a second ordinary clock 14. The second boundary clock 12 is also coupled to a third ordinary clock 15 and a fourth ordinary clock 16 via a transparent clock 17. Each ordinary clock 13,14,15,16 is a single port device. The timing system 10 may have other components, but they are not shown for simplicity.

It is to be understood that the timing system 10 is shown with a specific network hierarchy for exemplary purposes only. Other network hierarchies are possible and are within the scope of this disclosure. Alternative network hierarchies such as ring, mesh, star, fully connected, line, tree, bus, etc., or appropriate combinations thereof may be implemented. Furthermore, whilst each link shown in FIG. 1 might be an Ethernet link, it is to be understood that alternative links are possible and are within the scope of this disclosure. Appropriate combinations of different links may also be possible.

The operation of the timing system 10 will now be described by way of example. In some implementations, there is a determination of which one of the plurality of clocks 11,12,13,14,15,16 is most accurate and/or has greatest quality. This might for example involve negotiation among the plurality of clock 11,12,13,14,15,16 using Announce messages. In the illustrated example, it is assumed that the first ordinary clock 13 is most accurate and/or has greatest quality. Therefore, the first ordinary clock 13 becomes a "grandmaster," and all other clocks 11,12,14,15,16 directly or indirectly synchronise to the grandmaster as will be described below.

Since the first ordinary clock 13 is the grandmaster, it functions as master to the first boundary clock 11, which synchronises to the first ordinary clock 13. Since the first boundary clock 11 is a slave, it has a single slave port and transfers timing from that port to each master port. Thus, the first boundary clock 11 functions as master to the second ordinary clock 14 and the second boundary clock 12, which synchronise to the first boundary clock 11. Since the second boundary clock 12 is a slave, it has a single slave port and transfers timing from that port to each master port. Thus, the second boundary clock 12 functions as master to the third ordinary clock 15 and the fourth ordinary clock 16, which synchronise to the second boundary clock 12.

There are many ways in which synchronisation between a master and a slave can be accomplished. In some implementations, synchronisation is achieved through the exchange of messages across the communications medium. This can be implemented in a "one-step mode" in which a precise time is inserted into a synchronisation message on-the-fly by hardware. An example implementation using the one-step mode is described below with reference to FIG. 5. Alternatively, synchronisation can be implemented in a "two-step mode" in which the precise time of transmission is saved to memory and later provided in a follow-up message. Note that the two-step mode may utilize more bandwidth due to transmission of follow-up messages, and utilize significant CPU (Central Processing Unit) bandwidth as well. Example implementations using the two-step mode are described below with reference to FIGS. 2, 3, 6 and 7. Other synchronisation implementations are possible and are within the scope of the present disclosure.

Figure 2:
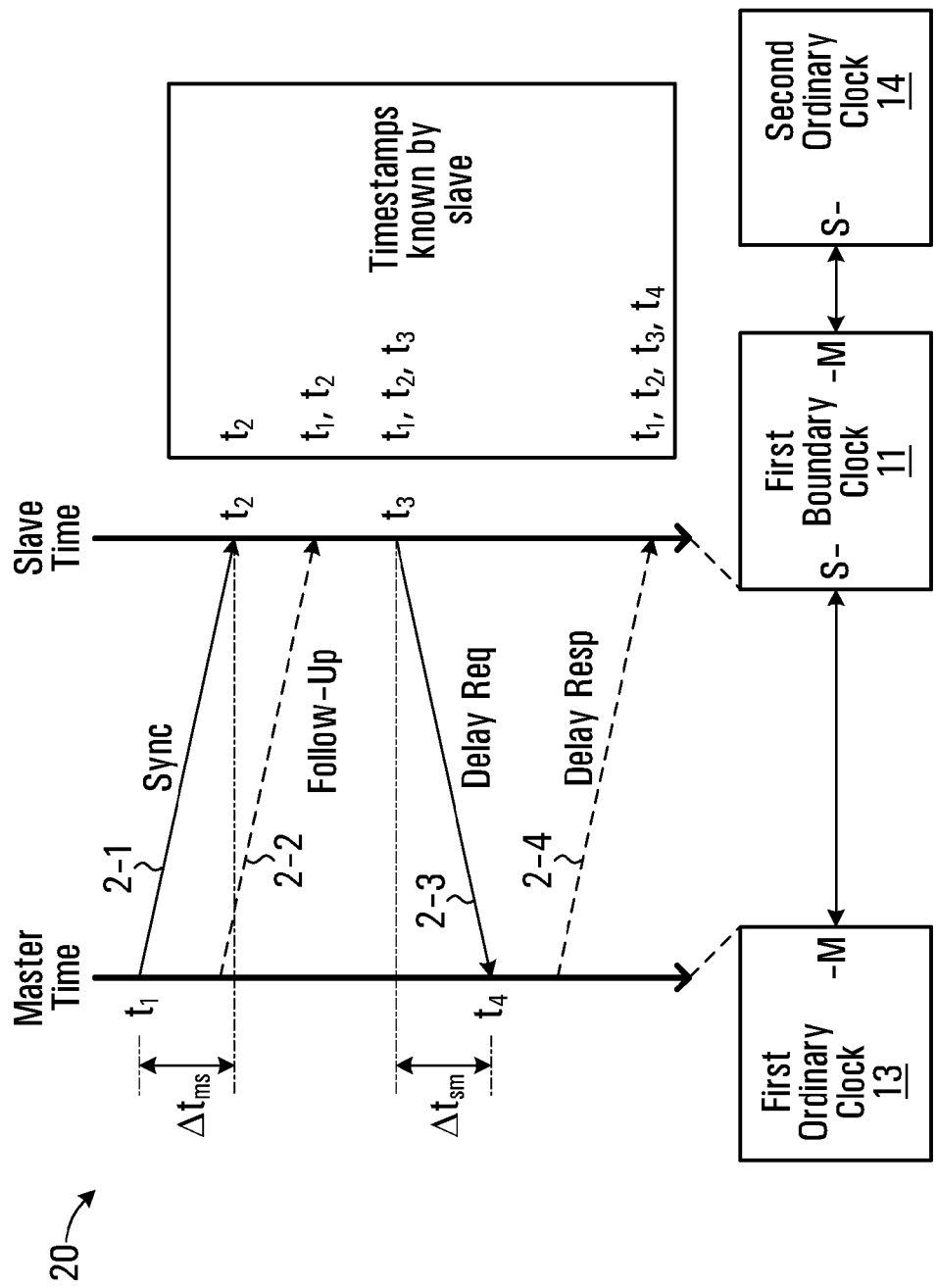
FIG. 2 is a signalling diagram featuring example synchronisation in the timing system of FIG. 1.

Referring now to FIG. 2, shown is a signalling diagram featuring example synchronisation in the timing system 10 of FIG. 1. In this example, signalling is shown between the first ordinary clock 13 and the first boundary clock 11 for the purposes of synchronising the first boundary clock 11 to the first ordinary clock 13. The other clocks 12,14,15 shown in FIG. 1 might be synchronised using similar signalling; however, the fourth ordinary clock 16 is synchronised in a different manner because it is coupled to the second boundary clock 12 via the transparent clock 17. Further details of synchronisation with a transparent clock are provided later under the section entitled "Synchronisation with Transparent Clock."

In this example, the signalling includes a master two-step sync packet. At step 2-1, the first ordinary clock 13 sends the two-step synchronisation message, and determines that it was sent at $t_1$ according to master time. The first boundary clock 11 receives the synchronisation message, and determines that it was received at $t_2$ according to slave time. At step 2-2, the first ordinary clock 13 sends a follow-up message including an indication of $t_1$. The first boundary clock 11 receives the follow-up message and therefore becomes aware of both $t_1$ and $t_2$, which differ in terms of an offset between the two clocks 13,11 plus a propagation time $\Delta t_{ms}$ as shown in equation 1.

$$t_2 = t_1 + \text{offset} + \Delta t_{ms} \quad [1]$$

If the propagation time $\Delta t_{ms}$ is assumed to be zero, then the offset between the two clocks 13,11 can be solved using equation 1. However, if the propagation time $\Delta t_{ms}$ is not zero, then the offset between the two clocks 13,11 cannot be solved with only $t_1$ and $t_2$. Therefore, further signalling is performed as will be described below.

At step 2-3, the first boundary clock 11 sends a delay request message, and determines that it was sent at $t_3$ according to slave time. The first ordinary clock 13 receives the delay request message, and determines that it was received at $t_4$ according to master time. At step 2-4, the first ordinary clock 13 sends a delay response message including an indication of $t_4$. The first boundary clock 11 receives the delay response message and therefore becomes aware of both $t_3$ and $t_4$, which differ in terms of the offset between the two clocks 13,11 plus a propagation time $\Delta t_{ms}$ as shown in equation 2.

$$t_4 = t_3 - \text{offset} + \Delta t_{sm} \quad [2]$$

If it is assumed that the propagation times $\Delta t_{sm}$ and $\Delta t_{ms}$ are identical as in the case of a symmetric link, then equation 1 minus equation 2 produces a relationship shown in equation 3.

$$t_2 - t_4 = t_1 - t_3 + 2 \cdot \text{offset} \quad [3]$$

Solving for the offset between the two clocks 13,11 produces a relationship shown in equation 4.

$$\text{offset} = \frac{t_2 - t_4 + t_3 - t_1}{2} \quad [4]$$

Therefore, equation 4 can be used to calculate the offset between the two clocks 13,11 when values for $t_1$, $t_2$, $t_3$, and $t_4$ are known. The first boundary clock 11 can then be adjusted according to the offset in order to achieve synchronisation.

By way of example, the following table includes sample values for $t_1$, $t_2$, $t_3$, and $t_4$, and an offset as calculated using equation 4. Note that the propagation times $\Delta t_{ms}$ and $\Delta t_{sm}$ can subsequently be solved using equations 1 and 2, respectively, and these values are also included in the table.

TABLE 1

Example Offset Calculation

| Quantity | Time at Master | Time at Slave | Result |
|---|---|---|---|
| $t_1$ | 9:00 | | |
| $t_2$ | | 10:30 | |
| $t_3$ | | 11:00 | |
| $t_4$ | 10:30 | | |
| $\Delta t_{ms}$ | | | 0:30 |
| $\Delta t_{sm}$ | | | 0:30 |
| offset | | | 1:00 |

By subtracting the offset of 1:00 from the first boundary clock 11, the two clocks 13,11 become synchronised.

In the illustrated example, the indication of $t_1$ is sent separately from the synchronisation message. This is an example of the two-step mode introduced earlier. In alternative implementations, the indication of $t_1$ is sent as part of the synchronisation message in which case there may not be a follow-up message. This is an example of the one-step mode introduced earlier. More generally, the indication of $t_1$ can be sent in any appropriate manner.

In some implementations, synchronisations occur on a periodic basis in order to account for "clock drift" whereby a slave clock is faster or slower than the master clock and thereby drifts out of sync. Alternatively, or additionally, the frequency of the slave clock is adjusted in order to mitigate or eliminate clock drift. This can be accomplished for example by comparing two sets of synchronisation messages. In particular, the frequencies of the slave and master clocks (FO and FR, respectively) between the two synchronisation messages can be determined and used to calculate a frequency adjustment FFO as shown in equation 5.

$$FFO = \frac{FO - FR}{FR} \quad [5]$$

The frequency of the slave clock can then be adjusted according to the frequency adjustment FFO.

The foregoing method of synchronisation assumes that the propagation times $\Delta t_{ms}$ and $\Delta t_{sm}$ are identical. This assumption can be applied without significant error in situations where two clocks are directly connected to one another in which case propagation delays may be symmetric and generally constant (i.e. little or no change over time). However, in other situations where two clocks are connected to one another through other network components, this assumption can lead to error. This is because some network components such as routers or switches might introduce a variable delay depending on various factors such as network traffic. Note that the variable delay may not be symmetric.

Referring back to FIG. 1, the transparent clock 17 is assumed to include a device (e.g. router or switch) that introduces a variable delay between the second boundary clock 12 and the fourth ordinary clock 16. In accordance with an embodiment of the disclosure, synchronisation of the fourth ordinary clock 16 to the second boundary clock 12 is performed by taking into account the variable delay. The accounting of variable delay involves various functionality provided by the transparent clock 17. In this disclosure, a "transparent clock" is a device that measures a time taken for a packet (e.g. event packet using PTP) to transit the device and provides this information to each clock receiving the packet. An example of how synchronisation might be performed with a transparent clock is provided below with reference to FIG. 3.

Synchronisation with Transparent Clock

Figure 3:
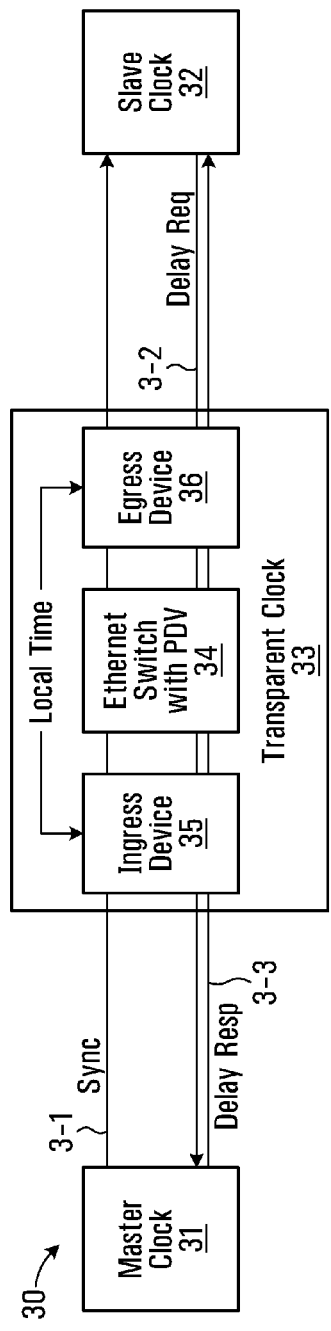
FIG. 3 is a block diagram of a timing system having a transparent clock between a master clock and a slave clock.

Referring now to FIG. 3, shown is a block diagram of a timing system 30 having a transparent clock 33 between a master clock 31 and a slave clock 32. The connection between the transparent clock 33 and the slave clock 32 is assumed to introduce a constant delay. Likewise, the connection between the transparent clock 33 and the master clock 31 is assumed to introduce a constant delay. However, the transparent clock 33 includes an Ethernet switch 34 with PDV (packet delay variation), which means that it introduces variable delays. In particular, the time that a packet spends transiting the Ethernet switch 34 (also known as residence time) is variable depending on various factors such as network traffic. Therefore, $\Delta t_{sm}$ and $\Delta t_{ms}$ cannot be assumed to be identical as in the example described above with reference to FIG. 2. In order to account for the variable delays, the transparent clock 33 has an Ingress device 35 and an Egress device 36.

The variable delays include $\Delta t_{EI}$ (i.e. delay from Egress device 36 to Ingress device 35, and $\Delta t_{IE}$ (i.e. delay from Ingress device 35 to Egress device 36). Thus, the propagation times $\Delta t_{ms}$ and $\Delta t_{sm}$ can be expressed in terms of the variable delays $\Delta t_{EI}$ and $\Delta t_{IE}$ and the constant delays:

$$\Delta t_{sm} = k + \Delta t_{EI}, \text{ and} \quad [6]$$

$$\Delta t_{ms} = k + \Delta t_{IE}, \quad [7]$$

where k is a constant representing the constant delays. Applying equations 6 and 7 to equation 1 minus equation 2 produces a relationship as shown in equation 8.

$$t_2 - t_4 = t_1 - t_3 + 2 \cdot \text{offset} + (k + \Delta t_{EI}) - (k + \Delta t_{IE}) \quad [8]$$

Solving for the offset between the two clocks 31,32 produces a relationship as shown in equation 9.

$$\text{offset} = \frac{t_2 - (t_1 + \Delta t_{IE}) + (t_3 + \Delta t_{EI}) - t_4}{2} \quad [9]$$

Therefore, in addition to determining values for $t_1$, $t_2$, $t_3$, and $t_4$, values for $\Delta t_{EI}$ and $\Delta t_{IE}$ can be determined in order to solve for the offset. Once the offset is calculated, the slave clock 32 can be adjusted according to the offset in order to achieve synchronisation between the two clocks 31,32.

The operation of the timing system 30 shown in FIG. 3 will now be described by way of example. At step 3-1, the master clock 31 sends a synchronisation message. In this example, the synchronisation message is sent using the one-step mode and therefore it includes the timestamp $t_1$ of transmission; however, it is noted that the two-step mode could alternatively be employed. The Ingress device 35 receives the synchronisation message and inserts into the synchronisation message a timestamp $t_A$ indicating when the synchronisation message arrived at the transparent clock 33. In some implementations, the timestamp is inserted only after an SOP (start of packet) is detected at PTP block. The Ingress device 35 might for example detect the SOP by synchronising to the data stream and detecting a SFD (start of frame delimiter). The synchronisation message transits the Ethernet switch 34 and is received by the Egress device 36. The Egress device 36 calculates $\Delta t_{IE}$ by subtracting a departure time $t_D$ of the synchronisation message from the arrival time $t_A$, and inserts an indication of $\Delta t_{IE}$ into the synchronisation message before sending it to the slave clock 32. The slave clock 32 determines that the synchronisation message was received at $t_2$ according to slave time. At the end of step 3-1, the slave clock 32 is aware of $t_1$, $t_2$ and $\Delta t_{IE}$.

At step 3-2, the slave clock 32 sends a delay request message, and determines that it was sent at $t_3$ according to slave time. The Egress device 36 receives the delay request message and inserts a timestamp $t_A$ into the delay request message indicating when the delay request message arrived at the transparent clock 33. In some implementations, the timestamp is inserted only after an SOP is detected at PTP block. The delay request message transits the Ethernet switch 34 and is received by the Ingress device 35. The Ingress device 35 calculates $\Delta t_{EI}$ by subtracting a departure time $t_D$ of the delay request message from the arrival time $t_A$, and inserts an indication of $\Delta t_{EI}$ into the delay request message before sending it to the master clock 32. The master clock 31 receives the delay request message, and determines that it was received at $t_4$ according to master time.

At step 3-3, the master clock 31 sends a delay response message including an indication of $t_4$ and an indication of $\Delta t_{EI}$. The transparent clock 33 forwards the delay response to the slave clock 32. In some implementations, the transparent clock 33 knows to simply forward a message without inserting any timestamp when an SOP is detected at PTP block. The transparent clock might for example look the PTP header and determine if it is a time sensitive packet (e.g. event packet) or a time insensitive packet (e.g. general message). The slave clock 32 receives the delay response message and therefore becomes aware of $t_4$ and $\Delta t_{EI}$, in addition to $t_1$, $t_2$ and $\Delta t_{IE}$ determined at step 3-1. Therefore, the slave clock 32 can calculate the offset between the two clocks 31,32 using equation 9 and then adjust itself accordingly in order to achieve synchronisation with the master clock 31.

In the illustrated example, the transparent clock 33 provides a local time to both the Ingress device 35 and the Egress device 36 so that the timestamps $t_A$ and $t_D$ can be determined. Note that there is no requirement for the transparent clock 33 itself to be synchronised with the master clock 31, as any offset would not affect the calculation of the variable delays $\Delta t_{EI}$ and $\Delta t_{IE}$. However, in some implementations, the transparent clock 33 is synchronised to the master clock. In specific implementations, the frequency of the transparent clock 33 is adjusted in order to mitigate or eliminate clock drift. Note that the frequency of the transparent clock 33 can affect the calculation of the variable delays $\Delta t_{EI}$ and $\Delta t_{IE}$. In further implementations, the transparent clock 33 itself functions as a master clock or a slave clock, an example of which is described below in further detail with reference to FIG. 8.

The Ingress device 35 and the Egress device 36 are implemented using hardware. However, more generally, the Ingress device 35 and the Egress device 36 may be implemented as hardware, firmware, software, or any appropriate combination thereof. In some implementations, the Ingress device 35 and the Egress device 36 are similar to one another or even identical to one another. A device is described as being an "Ingress" device when a message such as a synchronisation message enters the device. Likewise, a device is described as being an "Egress" device when the message leaves the device. However, if the message transits in the opposite direction, then the Ingress device becomes the Egress device and vice-versa. The terms "Ingress" and "Egress" are arbitrarily applied throughout this disclosure to distinguish between devices that are similar to one another or even identical to one another but are performing different functions.

There are many possibilities for the messaging at steps 3-1 through 3-3. Specific implementations for the messaging are provided below in which aspects of PTP signalling are adopted. Subsequent examples may also assume that aspects of PTP signalling are adopted. However, it is to be understood that aspects of any appropriate standard may be adopted as appropriate. For instance, in alternative implementations, aspects of NTP signalling are adopted. It is to be understood that several implementations are possible and are within the scope of this disclosure.

In specific implementations, the synchronisation message at step 3-1 is formatted according to Table 1.

TABLE 1

Sync and Delay Request Messages

| Bits | | | | | | | | Octets | Offset |
|---|---|---|---|---|---|---|---|---|---|
| 7 | 6 | 5 | 4 | 3 | 2 | 1 | 0 | | |
| header | | | | | | | | 34 | 0 |
| originTimestamp | | | | | | | | 10 | 34 |

Thus, the synchronisation message has a header and an originTimestamp. The timestamp $t_1$ of transmission is written in the originTimestamp. In accordance with an embodiment of the disclosure, the arrival time $t_A$ is written in the header.

In specific implementations, the arrival time $t_A$ is written in a reserved field of the header as highlighted in Table 2.

TABLE 2

Header of PTP Messages

| Bits | | | | | | | | Octets | Offset |
|---|---|---|---|---|---|---|---|---|---|
| 7 | 6 | 5 | 4 | 3 | 2 | 1 | 0 | | |
| transportSpecific | | | | messageType | | | | 1 | 0 |
| reserved | | | | versionPTP | | | | 1 | 1 |
| messageLength | | | | | | | | 2 | 2 |
| domainNumber | | | | | | | | 1 | 4 |
| reserved | | | | | | | | 1 | 5 |
| flagField | | | | | | | | 2 | 6 |
| correctionField | | | | | | | | 8 | 8 |
| reserved | | | | | | | | 4 | 16 |
| sourcePortIdentity | | | | | | | | 10 | 20 |
| sequencedId | | | | | | | | 2 | 30 |
| controlField | | | | | | | | 1 | 32 |
| logMessageInterval | | | | | | | | 1 | 33 |

In specific implementations, only the 32-LSBs of the arrival time ($t_A[31:0]$) are written into the reserved field. Whilst the arrival time $t_A$ has more than 32 bits, the most significant bits may not be needed in hardware and the reserved field has room for only 32 bits (i.e. 4 octets). In some implementations, the transparent clock will determine if rollover has occurred. Whilst the most significant bits may not be needed in hardware, in some implementations they are determined by software so that a complete timestamp can be used in various calculations.

Figure 4:
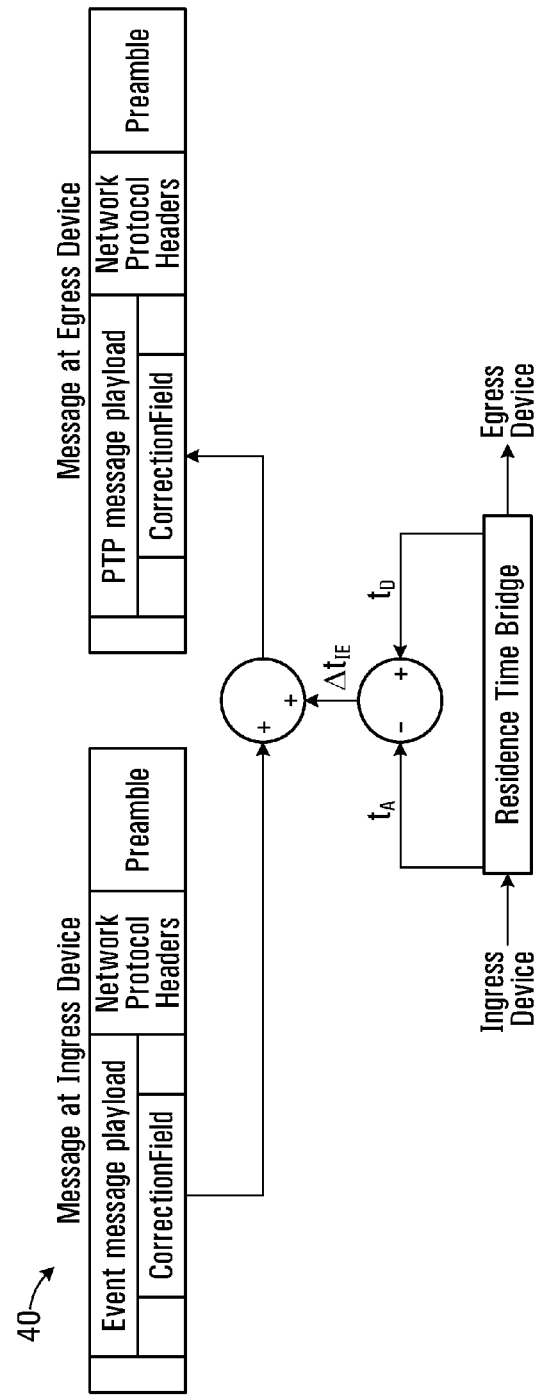
FIG. 4 is a block diagram of a model for accounting for a variable delay by the transparent clock of FIG. 3.

In specific implementations, the variable delay $\Delta t_{IE}$ is written in the correctionField of the header shown in Table 2. As noted above, the Egress device 36 calculates $\Delta t_{IE}$ by subtracting the departure time $t_D$ of the synchronisation message from the arrival time $t_A$, and inserts an indication of $\Delta t_{IE}$ into the synchronisation message before sending it to the slave clock 32. Shown in FIG. 4 is a block diagram of a model 40 for accounting for the variable delay. In some implementations, the difference between $t_D$ and $t_A$ is added to an existing value in the correctionField (i.e. the variable delay is cumulative) in order to account for a situation in which there is more than one transparent clock between the two clocks 31,32 being synchronised.

In some implementations, there are one or more non-participating nodes between two clocks being synchronised. A "non-participating node" is a node that does not account for time that a packet spends in transit through the node. An apparatus having an Ingress device and an Egress device is a non-participating node for example if its Ingress device or its Egress device does not support the functionality described above with reference to FIG. 3. In some implementations, the Egress device is configured to simply forward a packet in the event that the Ingress device (e.g. old Ingress device) does not support the functionality of conveying the arrival time $t_A$. Note that timing information in the packet (e.g. correctionField, originTimestamp) is left unchanged, and no erroneous calculation is performed.

In specific implementations, the delay request message at step 3-2 is formatted in the same manner shown in Table 1. Thus, the delay request message has a header and an originTimestamp. The timestamp $t_3$ of transmission is written in the originTimestamp. In accordance with an embodiment of the disclosure, the arrival time $t_A$ is written in the header. In specific implementations, the arrival time $t_A$ is written in a reserved field of the header as highlighted in Table 2. More generally, the arrival time $t_A$ can be written into the delay request message in any manner that does not interfere with any essential operation of the delay request message.

In specific implementations, the variable delay $\Delta t_{EI}$ is written in the correctionField of the header shown in Table 2. As noted above, the Ingress device 35 calculates $\Delta t_{EI}$ by subtracting the departure time $t_D$ of the synchronisation message from the arrival time $t_A$, and inserts an indication of $\Delta t_{EI}$ into the delay request message before sending it to the master clock 31. In some implementations, the difference between $t_D$ and $t_A$ is added to an existing value in the correctionField (i.e. the variable delay $\Delta t_{EI}$ is cumulative) in order to account for a situation in which there is more than one transparent clock between the two clocks 31,32 being synchronised. Thus, the accounting for the variable delay $\Delta t_{EI}$ is similar to the accounting for the variable delay $\Delta t_{IE}$.

In specific implementations, the delay response message at step 3-3 is formatted according to Table 3.

TABLE 3

Delay Response Message

| Bits | | | | | | | | Octets | Offset |
|---|---|---|---|---|---|---|---|---|---|
| 7 | 6 | 5 | 4 | 3 | 2 | 1 | 0 | | |
| header | | | | | | | | 34 | 0 |
| receiveTimestamp | | | | | | | | 10 | 34 |
| requesting PortIdentity | | | | | | | | 10 | 44 |

Thus, the delay response message has a header, a receiveTimestamp, and a requestingPortIdentity. The timestamp $t_4$ of reception is written in the receiveTimestamp. In specific implementations, the variable delay $\Delta t_{EI}$ from the delay request message is copied to the correctionField of the header. In specific implementations, the sourcePortIdentity field from the delay request message is copied to the requestingPortIdentity.

The transparent clock 33 shown in FIG. 3 is a specific type of transparent clock, namely an "end-to-end" transparent clock, which supports use of an end-to-end delay measurement mechanism between slave clocks and a master clock. Also, the model 40 shown in FIG. 4 is for end-to-end transparent clocks. Furthermore, subsequent examples may focus on end-to-end transparent clocks. However, it is to be understood that embodiments of the disclosure are also applicable to other types of transparent clocks. For instance, embodiments of the disclosure are applicable to "peer-to-peer" transparent clocks, which not only provide transit time information for a packet (e.g. event packet using PTP), but also provide corrections for any propagation delay of a link connected to a port receiving the packet. In some implementations, in the presence of peer-to-peer transparent clocks, delay measurements between slave clocks and a master clock are performed using the peer-to-peer delay measurement mechanism. In some implementations, this involves a peer delay request packet and a peer delay response packet in order to measure the propagation delay of the link.

Application Example 1

One-Step Mode

Figure 5:
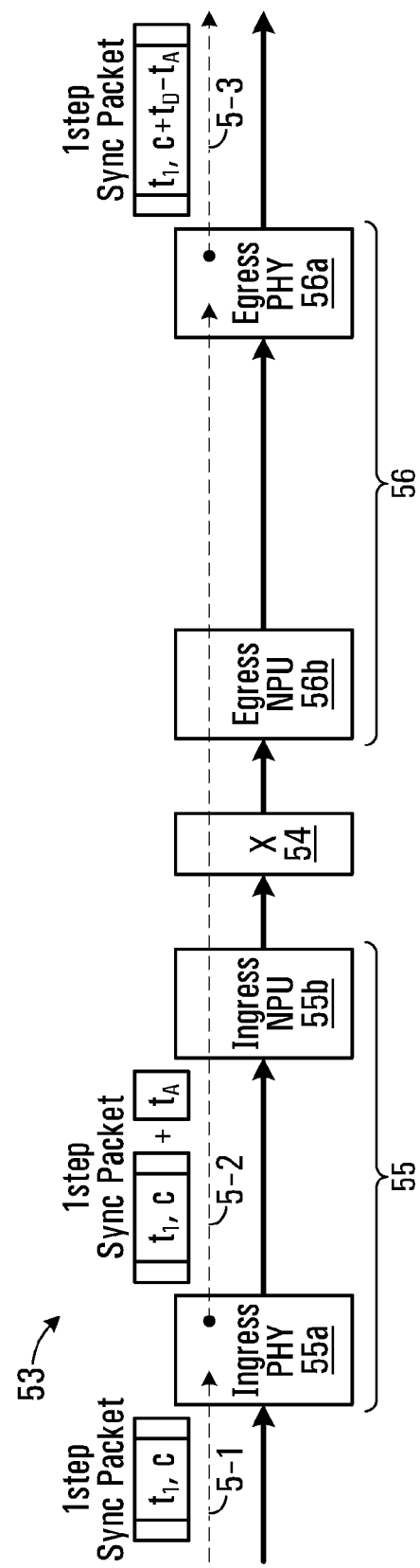
FIG. 5 is a block diagram of a transparent clock featuring a one-step mode for synchronisation.

Referring now to FIG. 5, shown is a block diagram of a transparent clock 53 featuring a one-step mode for synchronisation. The transparent clock 53 has a switch 54, Ingress devices 55, Egress devices 56, and may have other components that are not shown. The Ingress devices 55 include an Ingress PHY device 55a and an Ingress NPU 55b. The Egress devices 56 include an Egress PHY device 56a and an Egress NPU 56b.

The operation of the transparent clock 53 will now be described by way of example. At step 5-1, the Ingress PHY device 55a receives a synchronisation packet. According to the one-step mode, the synchronisation packet includes a timestamp $t_1$ of transmission by a master clock (not shown) and an initial correction c for any variable delay experienced prior to arriving at the transparent clock 53. If there were no variable delays prior to arriving at the transparent clock 53, then the initial correction c would be zero as set by the master clock. In some implementations, the initial correction c is written in a correctionField of the message.

At step 5-2, the Ingress PHY device 55a inserts into the synchronisation packet a timestamp $t_A$ indicating when the synchronisation packet arrived at the transparent clock 53. In this example, it is assumed that only 32-LSBs of the timestamp $t_A$ is inserted into 32-reserved bits of the synchronisation packet as similarly described above with reference to FIG. 3. The synchronisation packet transits the switch 54 and is received by the Egress PHY device 56a.

At step 5-3, the Egress PHY device 56a calculates $\Delta t_{IE}$ by subtracting a departure time $t_D$ of the synchronisation packet from the arrival time $t_A$, and adds this result to the initial correction c in accordance with equation 10.

If $t_D[31:0] >= t_A[31:0]$ then residence_time=$t_D[31:0]-t_A[31:0]$ else residence_time=$t_D[31:0]-t_A[31:0]+2^{32}$;

end if;

$C_{OUT}[63:0]=\{C_{IN}[63:16]+\text{residence\_time},C_{IN}[15:0]\}$     [10]

Note that if $t_D$ is less than $t_A$ due to only 32-LSBs being considered, then an amount of $2^{32}$ is added to the difference. Also note that in this example the 15 LSBs of the correctionField are not used, as they would represent accuracy in the sub-nano second range, which may not be needed for most applications. In some implementations, equation 10 is modified to account for a latency value provided by software. For peer-to-peer implementations, this might include the Ingress link delay, which might for example be measured using the steps described in section 6.6.4 of the IEEE 1588-2008.

In specific implementations, the Egress PHY device 56a clears the timestamp $t_A$ from the 32-reserved bits of the synchronisation packet before sending the synchronisation packet to a slave clock (not shown). Whilst the slave clock should consider the 32-reserved bits to be logic don't care, in some cases the slave clock relies on the 32-reserved bits being cleared.

After step 5-3, the synchronisation packet has an updated correction equal to $c+(t_D-t_A)$ when it is sent to the slave clock. Thus, there is an accounting for time that the synchronisation packet spent in transit through the transparent clock 53. Upon receiving the synchronisation packet at $t_2$, the slave clock becomes aware of the timestamps $t_1$ and $t_2$, and a total correction for all variable delays experienced by the synchronisation packet on route to the slave clock. If there are no variable delay elements between the transparent clock 53 and the slave clock, then the total correction would be equal to $c+(t_D-t_A)$. If there are additional variable delay elements between the transparent clock 53 and the slave clock, then the total correction would be $c+(t_D-t_A)+d$, where d represents any variable delay experienced after leaving the transparent clock 53.

Although not shown, there may subsequently be a delay request packet and a delay response packet as similarly described above with reference to FIG. 3 for the purposes of determining timestamps $t_3$ and $t_4$, and a total correction for all variable delays experienced by the delay request packet on route to the master clock. Processing of the delay request packet would involve similar processing shown in FIG. 5 but in the opposite direction. For instance, the Egress PHY device 56a would insert an arrival time $t_4$, and the Ingress PHY device 55a would extract a departure time $t_D$ and calculate an updated correction equal to $c+(t_D-t_A)$.

Once the slave clock has all four timestamps $t_1$, $t_2$, $t_3$ and $t_4$, and both total corrections, then the offset for synchronisation purposes can be calculated according to equation 11.

$$\text{offset} = \frac{t_2 - (t_1 + \Delta t_{C1}) + (t_3 + \Delta t_{C2}) - t_4}{2}, \quad [11]$$

wherein:
$\Delta t_{C1}$ represents the total correction for all variable delays experienced by the synchronisation packet on route to the slave clock, and
$\Delta t_{C2}$ represents the total correction for all variable delays experienced by the delay request packet on route to the master clock.

Note that equation 11 is based on equation 9, but has been generalized to account for presence of one or more variable delays provided by one or more transparent clocks.

The illustrated example shows how the transparent clock 53 accounts for time that an event packet spends in transit through the transparent clock 53. The event packet in the illustrated example is a specific type of event packet, namely a synchronisation packet. However, it is to be understood that embodiments of the disclosure are generally applicable to any packet that might be time-sensitive. Time-sensitive packets can include event packets such as synchronisation packets, delay request packets, peer delay request packets, and peer delay response packets. Other time-sensitive packets might be possible.

The Ingress and Egress PHY devices 55a,56a are implemented using hardware. However, more generally, the Ingress and Egress PHY devices 55a,56a may be implemented as hardware, firmware, software, or any appropriate combination thereof. In some implementations, the Ingress and Egress PHY devices 55a,56a are separate devices but have identical configurations. Alternatively, the Ingress and Egress PHY devices 55a,56a may have different configurations and/or form part of the same apparatus.

The transparent clock 53 is assumed to include both of the Ingress and Egress NPUs 55b,56b even though neither of the Ingress and Egress NPUs 55b,56b are required for the messaging shown in the illustrated example. Whilst it may be possible for the transparent clock 53 to omit both of the Ingress and Egress NPUs 55b,56b (i.e. the Ingress PHY and Egress PHY devices 55a,56a connect directly to the switch 54), having both of the Ingress and Egress NPUs 55b,56b can enable other messaging as will be described in the subsequent application examples. The Ingress and Egress NPUs 55b,56b are implemented using a combination of hardware and software. However, more generally, the Ingress and Egress NPUs 55b,56b may be implemented as hardware, firmware, software, or any appropriate combination thereof.

Application Example 2

Two-Step Mode

Figure 6A:
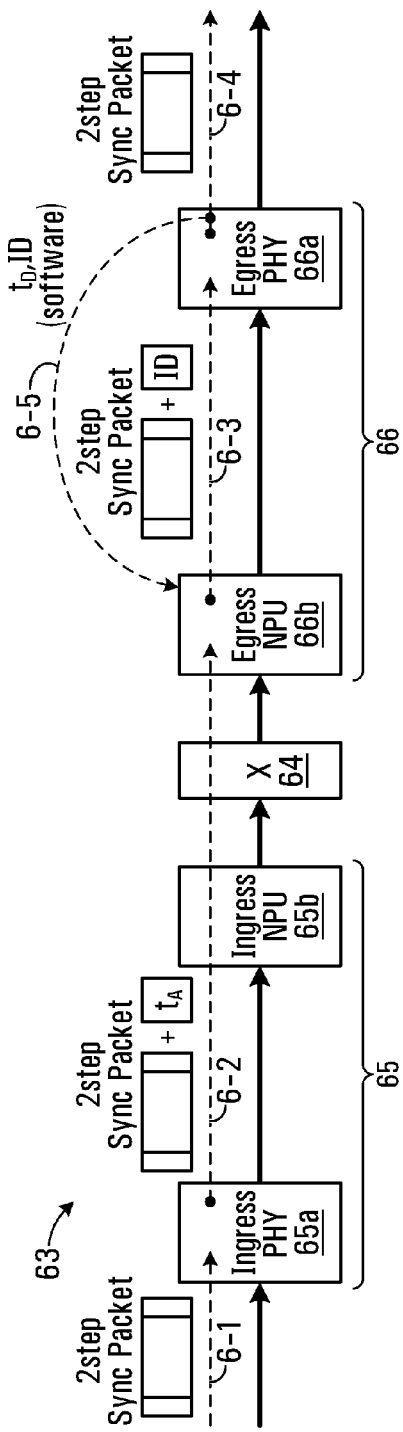
FIGS. 6A and 6B are block diagrams of a transparent clock featuring a two-step mode for synchronisation.
Figure 6B:
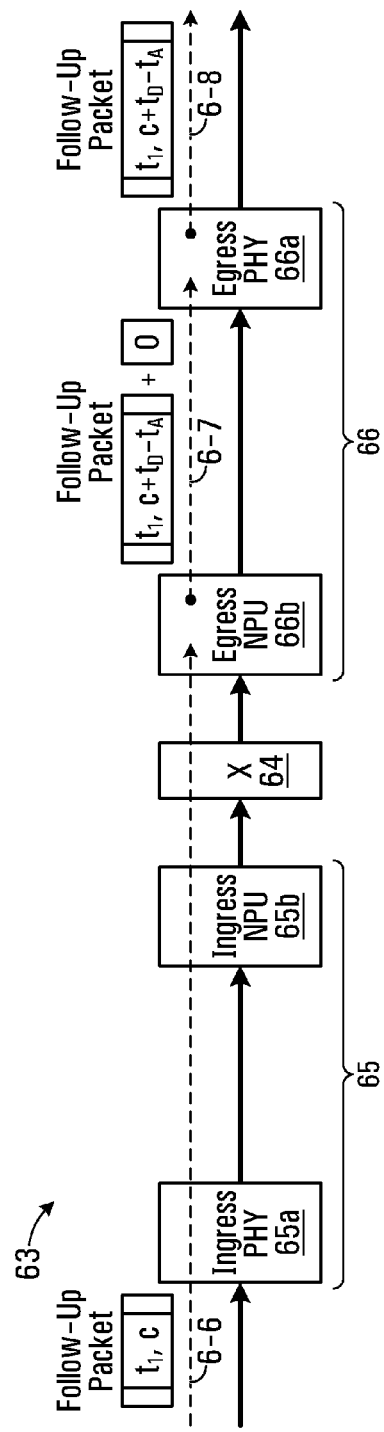

Referring now to FIGS. 6A and 6B, shown is a block diagram of a transparent clock 63 featuring a two-step mode for synchronisation. FIG. 6A depicts operation involving a synchronisation packet, while FIG. 6B depicts subsequent operation involving a follow-up packet. The transparent clock 63 has a switch 64, Ingress devices 65, Egress devices 66, and may have other components that are not shown. The Ingress devices 65 include an Ingress PHY device 65a and an Ingress NPU 65b. The Egress devices 66 include an Egress PHY device 66a and an Egress NPU 66b.

The operation of the transparent clock 63 will now be described by way of example. At step 6-1, the Ingress PHY device 65a receives a synchronisation packet. According to the two-step mode, the synchronisation packet does not need to include a timestamp $t_1$ of transmission by a master clock (not shown) or an initial correction c for any variable delay experienced prior to arriving at the transparent clock 63. Instead, since the transparent clock 63 operates using the two-step mode, such information is provided later in a follow-up packet. In some implementations, if the transparent clock 63 was previously operating using the one-step mode (see FIG. 5 for example), then the transparent clock 63 sets a two-step flag to '1'. If cascading multiple transparent clocks, the original synchronisation message sent by the master device might be converted from a two-step packet to a one-step packet.

At step 6-2, the Ingress PHY device 65a inserts into the synchronisation packet a timestamp $t_A$ indicating when the synchronisation packet arrived at the transparent clock 63. In this example, it is assumed that only 32-LSBs of the timestamp $t_A$ is inserted into 32-reserved bits of the synchronisation packet as similarly described above with reference to FIG. 3. The synchronisation packet transits the switch 64 and is received by the Egress devices 66. The Egress NPU 66b captures the timestamp $t_A$ from the synchronisation packet.

As noted above, the timestamp $t_1$ of transmission and the initial correction c are provided later in a follow-up packet. In most situations, both the synchronisation packet and the follow-up packet are successfully received by the Egress devices 66. However, on occasion, there may be a packet that does not reach the Egress devices 66. For instance, the switch 64 might on occasion drop a packet. Therefore, in order to avoid mix-ups caused by dropped packets, at step 6-3 the Egress NPU 66b overwrites the 32-reserved bits of the synchronisation packet with a unique ID, which is later used to reconcile the follow-up packet with the synchronisation packet. The Egress NPU 66b stores the timestamp $t_A$ with the unique ID, and in some implementations also stores PTP header info (e.g. seq ID, domain, number etc. . . . ). The synchronisation packet with the unique ID is received by the Egress PHY device 66a.

At step 6-4, the Egress PHY device 66a captures the unique ID and forwards the synchronisation packet to a slave clock (not shown). In some implementations, the Egress PHY device 66a clears the control information (i.e. the unique ID) before sending the synchronisation packet. The synchronisation packet is received by the slave clock at $t_2$. At step 6-5, the Egress PHY device 66a writes the departure time $t_D$ and the unique ID into a timestamp extraction FIFO (first in first out) of the Egress NPU 66b. Note that the timestamp extraction FIFO might include other pairs of departure time $t_D$ and unique ID from other synchronisation flows. The unique IDs ensure that the correct departure time $t_D$ is used when later calculating the residence time. In some implementations, after the synchronisation packet exits the transparent clock 63, an Egress PHY interrupt is set indicating that there is a valid timestamp $t_D$ in the extraction FIFO. In further implementations, software operating on the Egress NPU 66b reads the timestamp $t_D$ and the unique ID from the extraction FIFO, and use the unique ID to reconcile this with the PTP header info. The PTP header info indicates which follow-up packet to update.

At step 6-6, the follow-up packet transits the Ingress devices 65 and the switch 64, and is received by the Egress NPU 66b. According to the two-step mode, the follow-up packet includes the timestamp $t_1$ of when the synchronisation packet at step 6-1 was sent by the master device. The follow-up packet also includes an initial correction c for any variable delay experienced prior to arriving at the transparent clock 63. If there were no variable delays prior to arriving at the Ingress device 65, then the initial correction c would be zero as set by the master clock. In some implementations, the initial correction c is written in a correctionField of the follow-up packet.

The Egress NPU 66b captures the follow-up packet, and calculates $\Delta t_{IE}$ by subtracting the departure time $t_D$ of the synchronisation packet from the arrival time $t_A$, and adds this result to the initial correction c in accordance with equation 10. At step 6-7, the follow-up packet with an updated correction of $c+(t_D-t_A)$ is provided to the Egress PHY device 66a. Note that the follow-up packet does not include the unique ID.

Note that the 32-reserved bits can be utilized for an arrival time $t_A$ or a unique ID. The input of the Egress PHY device 56a shown in FIG. 5 receives a synchronisation packet, which under the one-step mode has the arrival time $t_A$. By contrast, the input of the Egress PHY device 66a shown in FIGS. 6A and 6B receives (1) a synchronisation packet, which under the two-step mode has the unique ID, and (2) a follow up packet, which does not have the unique ID. In specific implementations, the 32-reserved bits as received by an Egress PHY device are utilized to convey control information (CI) in the manner shown in Table 4.

TABLE 4

Format of Control Information

| Mode | CI[31:17] | CI[16] | CI[15:0] |
|---|---|---|---|
| One-step TC (transiting packet) | | $t_A[31:0]$ | |
| Other packets | 0 (unused) | 0 | — |
| | | 1 | ID |

According to Table 4, presence of the unique ID is represented by the 16$^{th}$ bit of the 32-bit reserved field. Thus, the synchronisation packet at step 6-3, which includes the unique ID, includes an "extraction" flag in the form of a '1' in the 16$^{th}$ bit of the 32-bit reserved field. Also, the follow-up packet at step 6-7, which does not have the unique ID, has a '0' in the 16$^{th}$ bit of the 32-bit reserved field signifying that no extraction of any unique ID is to be done.

At step 6-8, the follow-up packet is forwarded to the slave clock. Note that the follow-up packet has an updated correction equal to $c+(t_D-t_A)$. Thus, there is an accounting for time that the synchronisation packet spent in transit through the transparent clock 63. Upon receiving the follow-up packet, the slave clock becomes aware of the timestamp $t_1$ and a total correction for all variable delays experienced by the synchronisation packet on route to the slave clock.

Although not shown, there may subsequently be a delay request packet and a delay response packet as similarly described above with reference to FIG. 3 for the purposes of determining timestamps $t_3$ and $t_4$, and a total correction for all variable delays experienced by the delay request packet on route to the master clock. Once the slave clock has all four timestamps $t_1, t_2, t_3$ and $t_4$, and both total corrections, then the offset for synchronisation purposes can be calculated according to equation 11.

The illustrated example shows how the transparent clock 63 accounts for time that an event packet spends in transit through the transparent clock 63. The event packet in the illustrated example is a specific type of event packet, namely a synchronisation packet. However, it is to be understood that embodiments of the disclosure are generally applicable to any packet that might be time-sensitive. Time-sensitive packets can include event packets such as synchronisation packets, delay request packets, peer delay request packets, and peer delay response packets.

The Ingress and Egress PHY devices 65a,66a are implemented using hardware. However, more generally, the Ingress and Egress PHY devices 65a,66a may be implemented as hardware, firmware, software, or any appropriate combination thereof. In some implementations, the Ingress and Egress PHY devices 65a,66a are separate devices but have identical configurations. Alternatively, the Ingress and Egress PHY devices 65a,66a may have different configurations and/or form part of the same apparatus.

The transparent clock 63 is assumed to include both of the Ingress and Egress NPUs 65b,66b even though the Ingress NPU 65b is not required for the messaging shown in the illustrated example. Whilst it may be possible for the transparent clock 63 to omit the Ingress NPU 65b (i.e. the Ingress PHY device 65a connects directly to the switch 64), having both of the Ingress and Egress NPUs 65b,66b provides a symmetry that can enable the same processing in the opposite direction. The Ingress and Egress NPUs 65b,66b are implemented using a combination of hardware and software. However, more generally, the Ingress and Egress NPUs 65b,66b may be implemented as hardware, firmware, software, or any appropriate combination thereof.

Application Example 3

One-Step Event Packet Entering a Two-Step Mode TC

The transparent clock 63 shown in FIGS. 6A and 6B is configured for two-step mode for synchronisation in which the Ingress PHY device 65a receives a synchronisation packet at step 6-1 and a follow-up packet at step 6-6 with timing information (i.e. timestamp $t_1$ and initial correction c). This is in contrast with the transparent clock 53 shown in FIG. 5 in which the Ingress PHY device 55a receives the synchronisation packet at step 5-1 with the timing information. In another implementation, an Ingress PHY device receives a synchronisation packet with the timing information as similarly shown in FIG. 5, but nonetheless uses a follow-up packet to send updated timing information to a slave clock. An example of this is described below with reference to FIGS. 7A and 7B.

Figure 7A:
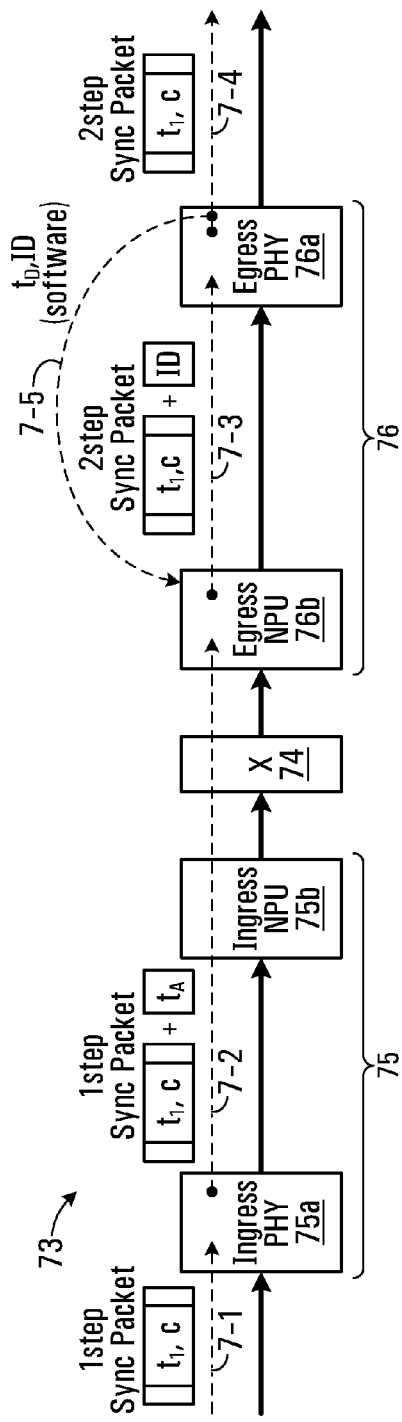
FIGS. 7A and 7B are block diagrams of a transparent clock featuring another two-step mode for synchronisation.
Figure 7B:
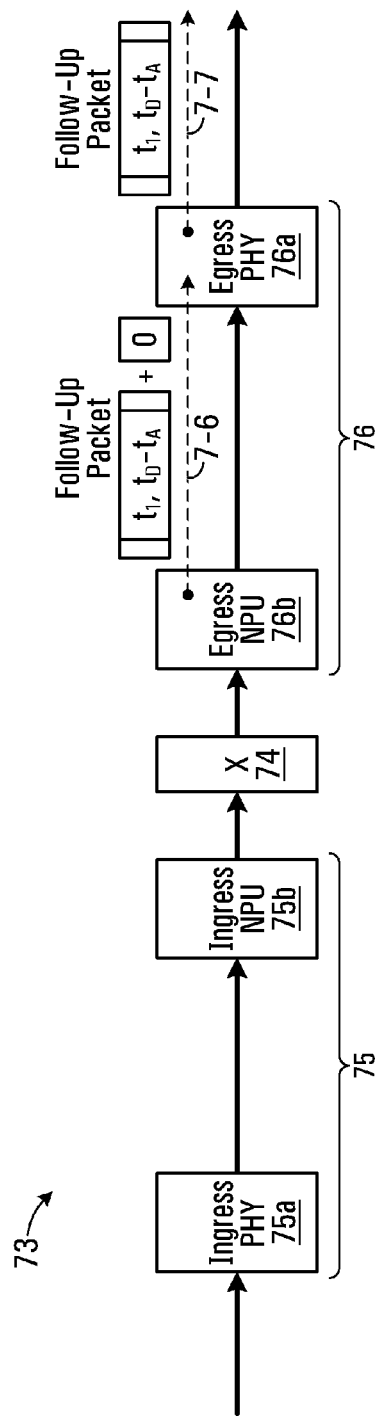

Referring now to FIGS. 7A and 7B, shown is a block diagram of a transparent clock 73 featuring another two-step mode for synchronisation. FIG. 7A depicts operation involving a synchronisation packet, while FIG. 7B depicts subsequent operation involving a follow-up packet. The transparent clock 73 has a switch 74, Ingress devices 75, Egress devices 76, and may have other components that are not shown. The Ingress devices 75 include an Ingress PHY device 75*a* and an Ingress NPU 75*b*. The Egress devices 76 include an Egress PHY device 76*a* and an Egress NPU 76*b*.

The operation of the transparent clock 73 will now be described by way of example. At step 7-1, the Ingress PHY device 75*a* receives a synchronisation packet. According to the one-step mode, the synchronisation packet includes a timestamp $t_1$ of transmission by a master clock (not shown) and an initial correction c for any variable delay experienced prior to arriving at the transparent clock 73. If there were no variable delays prior to arriving at the transparent clock 73, then the initial correction c would be zero as set by the master clock. In some implementations, the initial correction c is written in a correctionField of the synchronisation packet.

At step 7-2, the Ingress PHY device 75*a* inserts into the synchronisation packet a timestamp $t_A$ indicating when the synchronisation packet arrived at the transparent clock 73. In this example, it is assumed that only 32-LSBs of the timestamp $t_A$ is inserted into 32-reserved bits of the synchronisation packet as similarly described above with reference to FIG. 3. The synchronisation packet transits the switch 74 and is received by the Egress devices 76. The Egress NPU 76*b* captures the timestamp $t_A$ from the synchronisation packet.

The Egress NPU 76*b* calculates $\Delta t_{IE}$ by subtracting a departure time $t_D$ of the synchronisation packet from the arrival time $t_A$. However, according to the two-step mode, the departure time $t_D$ is captured by the Egress PHY device 76*a* and the calculation is performed after the synchronisation packet is forwarded to a slave device. Note that there may be other synchronisation packets, which could cause a mix-up whereby the calculation of $\Delta t_{IE}$ uses an incorrect arrival time $t_A$ and/or an incorrect departure time $t_D$. Therefore, at step 7-3 the Egress NPU 66*b* overwrites the 32-reserved bits of the synchronisation packet with a unique ID, which is later used to reconcile the departure time $t_D$ with the arrival time $t_A$. The Egress NPU 76*b* also sets a two-step flag to '1'. The synchronisation packet with the unique ID and the two-step flag is received by the Egress PHY device 76*a*.

At step 7-4, the Egress PHY device 76*a* extracts/removes the unique ID and forwards the synchronisation packet to the slave clock. At step 7-5, the Egress PHY device 76*a* writes the departure time $t_D$ and the unique ID into a timestamp extraction FIFO (first in first out) of the Egress NPU 76*b*. Note that the timestamp extraction FIFO might include other pairs of departure time $t_D$ and unique ID from other synchronisation flows. The unique IDs ensure that the correct departure time $t_D$ is used when later calculating the residence time.

The Egress NPU 76*b* calculates $\Delta t_{IE}$ by subtracting the departure time $t_D$ of the synchronisation packet from the arrival time $t_A$. At step 7-6, a follow-up packet with a second correction $\Delta t_{IE} = t_D - t_A$ is generated and provided to the Egress PHY device 76*a*. Note that the follow-up packet does not include the unique ID. Also note that the initial correction c has already been conveyed via the synchronisation message at step 7-4. Thus, the transparent clock 73 separately conveys two corrections: the initial correction c for any variable delay experienced prior to arriving at the transparent clock 73, and the second correction $\Delta t_{IE} = t_D - t_A$ for time that the synchronisation packet spent in transit through the transparent clock 73.

Note that the 32-reserved bits can be utilized for an arrival time $t_A$ or a unique ID. The input of the Egress PHY device 76*a* receives (1) a synchronisation packet, which under the two-step mode has the unique ID, and (2) a follow up packet, which does not have the unique ID. In specific implementations, the 32-reserved bits as received by an Egress PHY device are utilized in the manner shown in Table 4.

At step 7-7, the follow-up packet is forwarded to the slave clock. Note that the follow-up packet has the second correction $\Delta t_{IE} = t_D - t_A$. Thus, there is an accounting for time that the synchronisation packet spent in transit through the transparent clock 73. Upon receiving the follow-up packet, the slave clock becomes aware of the timestamp $t_1$, and can calculate a total correction for all variable delays experienced by the synchronisation packet on route to the slave clock.

Although not shown, there may subsequently be a delay request packet and a delay response packet as similarly described above with reference to FIG. 3 for the purposes of determining timestamps $t_3$ and $t_4$, and a total correction for all variable delays experienced by the delay request packet on route to the master clock. Any initial correction c from the packet would be added to the residence time and inserted into a delay response packet. Once the slave clock has all four timestamps $t_1$, $t_2$, $t_3$ and $t_4$, and both total corrections, then the offset for synchronisation purposes can be calculated according to equation 11.

The illustrated example shows how the transparent clock 73 accounts for time that an event packet spends in transit through the transparent clock 73. The event packet in the illustrated example is a specific type of event packet, namely a synchronisation packet. However, it is to be understood that embodiments of the disclosure are generally applicable to any packet that might be time-sensitive. Time-sensitive packets can include event packets such as synchronisation packets, delay request packets, peer delay request packets, and peer delay response packets.

The Ingress and Egress PHY devices 75*a*,76*a* are implemented using hardware. However, more generally, the Ingress and Egress PHY devices 75*a*,76*a* may be implemented as hardware, firmware, software, or any appropriate combination thereof. In some implementations, the Ingress and Egress PHY devices 75*a*,76*a* are separate devices but have identical configurations. Alternatively, the Ingress and Egress PHY devices 75*a*,76*a* may have different configurations and/or form part of the same apparatus.

The transparent clock 73 is assumed to include both of the Ingress and Egress NPUs 75*b*,76*b* even though the Ingress NPU 75*b* is not required for the messaging shown in the illustrated example. Whilst it may be possible for the transparent clock 73 to omit the Ingress NPU 75*b* (i.e. the Ingress PHY device 75*a* connects directly to the switch 74), having both of the Ingress and Egress NPUs 75*b*,76*b* provides a symmetry that can enable the same messaging in the opposite direction. The Ingress and Egress NPUs 75*b*,76*b* are implemented using a combination of hardware and software. However, more generally, the Ingress and Egress NPUs 75*b*,76*b* may be implemented as hardware, firmware, software, or any appropriate combination thereof.

Application Example 4

Master-Slave Mode

The application examples presented above involve synchronisation between a master clock and a slave clock via a transparent clock. In each application example, the transparent clock receives a synchronisation packet from the master clock, processes the synchronisation packet, and forwards the synchronisation packet to the slave clock. Alternatively, or additionally, the transparent clock itself functions as a master or a slave to another clock. For example, the transparent clock might operate as a master to one or more slave clocks, and/or operate as a slave to a master clock. An example of how this might be implemented is described below with reference to FIG. 8.

Figure 8:
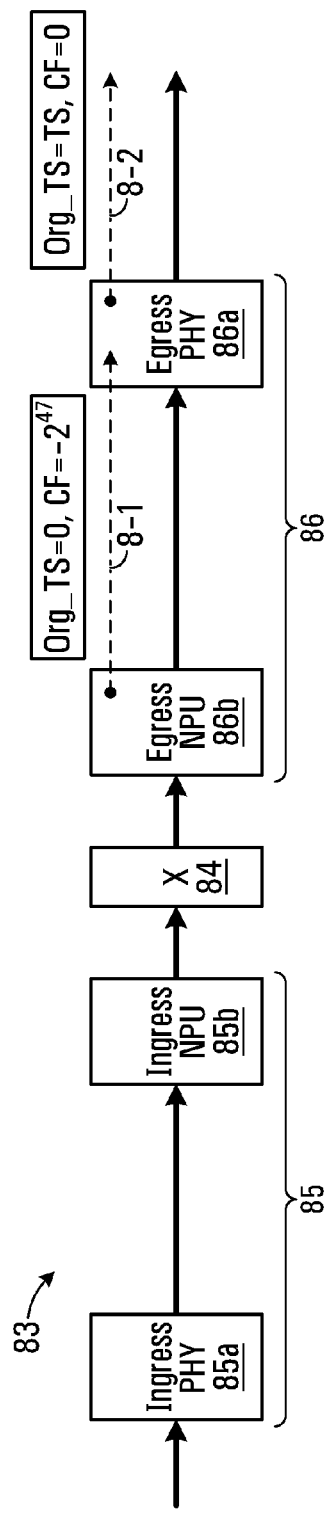
FIG. 8 is a block diagram of a transparent clock featuring a master-slave mode for synchronisation.

Referring now to FIG. 8, shown is a block diagram of a transparent clock 83 featuring a master-slave mode for synchronisation. The transparent clock 83 has a switch 84, Ingress devices 85, Egress devices 86, and may have other components that are not shown. The Ingress devices 85 include an Ingress PHY device 85a and an Ingress NPU 85b. The Egress devices 86 include an Egress PHY device 86a and an Egress NPU 86b.

The operation of the transparent clock 83 will now be described by way of example. The transparent clock 83 might process event packets as similarly described above with reference to any of FIGS. 3 through 7, and might also process other traffic. Additionally, in this example the transparent clock 83 is assumed to operate as a master to a slave clock (not shown). In order to initiate synchronisation with the slave clock, at step 8-1, the Egress NPU 86b generates an event packet with an indication for the Egress PHY device 86a to insert a timestamp into the event packet. The indication can be any appropriate indication that distinguishes the event packet from other transiting packets. In some implementations, the indication is a predefined value written in the correctionField. In further implementations, the indication is carried using the 48 MSBs (i.e. nano-second bits) of the correctionField. In specific implementations, the indication is a large negative value, for example correctionField=$-2^{47}$.

Note that any event packet transiting the switch 84 and received by the Egress devices 86 would not normally have a negative value written in the correctionField according to the implementations described herein. Therefore, the Egress NPU 86b inserting any negative value into the correctionField can distinguish the event packet generated by the Egress NPU 86b from other event packets. However, in alternative implementations, an event packet transiting the switch 84 and received by the Egress devices 86 may have a negative value in its correctionField. For such alternative implementations, the LSBs (i.e. sub-nano second bits) of the correctionField can be used in order to distinguish transiting packets from event packets generated by the Egress NPU 86b. For instance, the sub-nano second bits can be used as a flag instead of carrying any sub-ns time value.

In the illustrated example, the Egress NPU 86b generates the event packet with OriginTimestamp=0. However, it is noted that the OriginTimestamp provided by the Egress NPU 86b is arbitrary because the OriginTimestamp will be overwritten by the Egress PHY device 86a. Therefore, alternative implementations are possible in which the Egress NPU 86b generates the event packet with another value written in the OriginTimestamp.

The event packet with the indication (e.g. correctionField=$-2^{47}$) is received by the Egress PHY device 86a. The Egress PHY device 86a parses and recognizes the indication from the event packet. In response, the Egress PHY device 86a inserts a timestamp into OriginTimestamp and resets the correctionField. At step 8-2, the event packet with the timestamp is forwarded to the slave clock. The Egress PHY device 86a treats all other packets like Egress TC. Note that the same communication path used for other packets is used for the event packet at step 8-2. This is made possible by using the indication that distinguishes the event packet from other transiting packets.

Whilst the transparent clock 83 has been described to operate as a master to the slave clock, it is to be understood that the transparent clock 83 can alternatively or additionally operate as a slave to a master clock (not shown). When operating as a slave to a master clock, the signalling would be similar to that shown in FIG. 8. Whilst the type of signalling may differ because master clocks and slave clocks might send and receive different types of messages (see for example FIG. 2), the same indication (e.g. correctionField=$-2^{47}$) can be used as described above.

The Ingress and Egress PHY devices 85a,86a are implemented using hardware. However, more generally, the Ingress and Egress PHY devices 85a,86a may be implemented as hardware, firmware, software, or any appropriate combination thereof. In some implementations, the Ingress and Egress PHY devices 85a,86a are separate devices but have identical configurations. Alternatively, the Ingress and Egress PHY devices 85a,86a may have different configurations and/or form part of the same apparatus.

The transparent clock 83 is assumed to include both of the Ingress and Egress NPUs 85b,86b even though the Ingress NPU 85b is not required for messaging shown in the illustrated example. Whilst it may be possible for the transparent clock 83 to omit the Ingress NPU 85b (i.e. the Ingress PHY device 85a connects directly to the switch 84), having both of the Ingress and Egress NPUs 85b,86b provides a symmetry that can enable the same messaging in the opposite direction. The Ingress and Egress NPUs 85b,86b are implemented using a combination of hardware and software. However, more generally, the Ingress and Egress NPUs 85b,86b may be implemented as hardware, firmware, software, or any appropriate combination thereof.

The application examples presented above demonstrate how the correctionField and the 32-reserved bits for control information are used. A summary of the example values for the correctionField (CF[63:0]) and the control information (CI[31:0]) at the input of an Egress PHY device are shown in Table 5.

TABLE 5

Format of correctionField and Control Information

| Mode | CF[63:0] | CI[31:17] | CI[16] | CI[15:0] |
|---|---|---|---|---|
| One-step TC (transiting) | $CF_{IN}$[63:0] | | $t_A$[31:0] | |
| Two-step TC (transiting) | $CF_{IN}$[63:0] | 0 (unused) | 1 | ID |
| Event Packet (generated) | $-2^{47}$ | 0 (unused) | 1 | ID |
| Non-PTP packets using $t_D$ | | NA | | |

Application Example 5

Other Mode

The examples presented above utilize 32-reserved bits of a common PTP header to communicate control information such as an arrival time $t_A$ and a unique ID. Such implementations might be compatible with Ethernet, IPv4 and IPv6 encapsulations currently defined in IEEE 1588-2008, Annex F, D and E. However, it is to be understood that other ways of communicating the control information are possible and are within the scope of this disclosure. The control information can be written into a packet in any appropriate manner that does not interfere with normal operation of the packet. For instance, in an alternative implementation, the control information is provided by appending (or pre-pending) 32 bits of control information (CI[31:0]) at the end (or at the beginning) of all packets. Thus, other PTP encapsulation formats not yet defined by IEEE 1588-2008 (such as MPLS or MAC-in-MAC) are possible. An example of this is described below with reference to FIG. 9.

Figure 9:
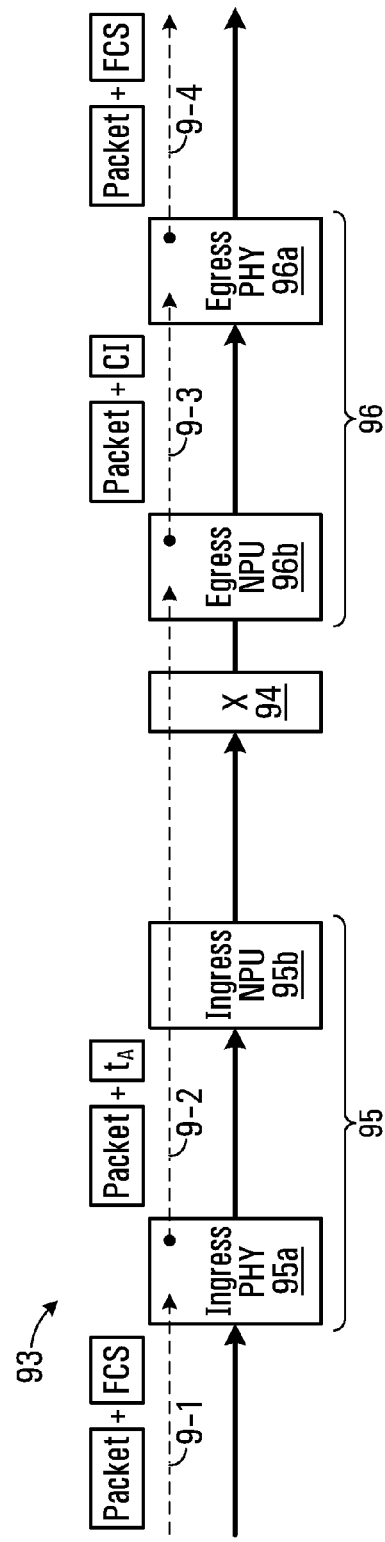
FIG. 9 is a block diagram of a transparent clock featuring a two-step mode for synchronisation with other messaging.

Referring now to FIG. 9, shown is a block diagram of a transparent clock 93 featuring a two-step mode for synchronisation using other messaging. The transparent clock 93 has a switch 94, Ingress devices 95, Egress devices 96, and may have other components that are not shown. The Ingress devices 95 include an Ingress PHY device 95a and an Ingress NPU 95b. The Egress devices 96 include an Egress PHY device 96a and an Egress NPU 96b.

The operation of the transparent clock 93 will now be described by way of example. At step 9-1, the Ingress PHY device 95a receives a packet that has an FCS (frame check sequence). The packet may be of any appropriate type including those that are not presently defined by IEEE 1588-2008. At step 9-2, the Ingress PHY device 95a inserts into the packet a timestamp $t_A$ indicating when the packet arrived at the transparent clock 93. However, in contrast with previous application examples, the Ingress PHY device 95a replaces the FCS with the timestamp $t_A$ (32-LSB of timewheel). Thus, the timestamp $t_A$ is not written to 32-reserved bits of a header. The packet with the timestamp $t_A$ written in the FCS transits the switch 94 and is received by the Egress NPU 96b.

At step 9-3, the Egress NPU 96b saves the timestamp $t_A$ and inserts control information into the FCS. The control information includes an indication for the Egress PHY device 96a to extract the departure time $t_D$ along with a unique ID as similarly described above with reference to FIGS. 6 and 7. In specific implementations, this indication is provided by CI[16]=1 as similarly described in the previous application examples. In alternative implementations, the indication is written in the control information in a different manner. More generally, the indication can be provided by any appropriate means. The synchronisation packet with the control information is received by the Egress PHY device 96a.

At step 9-4, The Egress PHY device 96a reads the control information from the FCS, generates a new FCS for the packet, and replaces the FCS with the new FCS. In this example, since the contents of the packet at step 9-4 are identical to the contents of the packet at step 9-1, the new FCS may be identical to the FCS of the packet at step 9-1. However, if the contents of the packet were to be modified during transit, then the new FCS would be different from the FCS of the packet at step 9-1.

Although not shown, the Egress PHY device 96a also extracts the departure time $t_D$ and writes the same into a timestamp extraction FIFO of the Egress NPU 96b along with the unique ID as similarly described above with reference to FIGS. 6 and 7. Subsequently, the Egress NPU 96b calculates $t_D-t_A$ and updates a correctionField on a follow-up packet as similarly described above with reference to FIGS. 6 and 7.

Unfortunately, by using the FCS of the packet to hold the control information, the FCS may no longer be appropriate for detecting bit errors. Thus, if the packet experiences a bit error for example from transiting the switch 94, then such bit error may go undetected. However, in some implementations, the ability to carry out error indication is provided by separate means. In specific implementations, a programmable 32-bit register is used to indicate when a packet has an error. If the timewheel happens to be at this value when a good packet is present, the h/w would add 1 nS to $t_A$ to avoid this special value.

In alternative implementations, another portion of the packet is used for the control information. For example, the preamble of the packet can be is used to carry the control information instead of the FCS. In further implementations, a CRC (cyclic redundancy check) is included when using the preamble. The CRC might for for example be 8-bits. This can help to ensure the $t_A$ time in the preamble has no bit errors. This may be implemented because the CRC does not cover the preamble.

The Ingress and Egress PHY devices 95a,96a are implemented using hardware. However, more generally, the Ingress and Egress PHY devices 95a,96a may be implemented as hardware, firmware, software, or any appropriate combination thereof. In some implementations, the Ingress and Egress PHY devices 95a,96a are separate devices but have identical configurations. Alternatively, the Ingress and Egress PHY devices 95a,96a may have different configurations and/or form part of the same apparatus.

The transparent clock 93 is assumed to include both of the Ingress and Egress NPUs 95b,96b even though the Ingress NPU 95b is not required for the messaging shown in the illustrated example. Whilst it may be possible for the transparent clock 93 to omit the Ingress NPU 95b (i.e. the Ingress PHY device 95a connects directly to the switch 94), having both of the Ingress and Egress NPUs 95b,96b provides a symmetry that can enable the same messaging in the opposite direction. The Ingress and Egress NPUs 95b,96b are implemented using a combination of hardware and software. However, more generally, the Ingress and Egress NPUs 95b,96b may be implemented as hardware, firmware, software, or any appropriate combination thereof.

Non-Participating Node

Various implementations have been described in which a transparent clock has an Ingress PHY device and an Egress PHY device with similar or even identical configurations to one another. In alternative implementations, the Ingress PHY device and the Egress PHY device are not identical and actually differ from one another in terms of supported functionality. This might for example occur when combining new and old equipment (e.g. an old Ingress PHY device with a new Egress PHY device).

In contrast with previous application examples, the Ingress PHY device might forward an event packet without inserting a timestamp $t_A$ indicating when the event packet arrived at the transparent clock. This is because the Ingress PHY device 105a does not support the functionality of capturing and inserting the timestamp $t_A$ into the event packet. This might for example be a result of the Ingress PHY device 105a being old. The event packet is received by the Egress devices 106.

First Example Method

Figure 10:
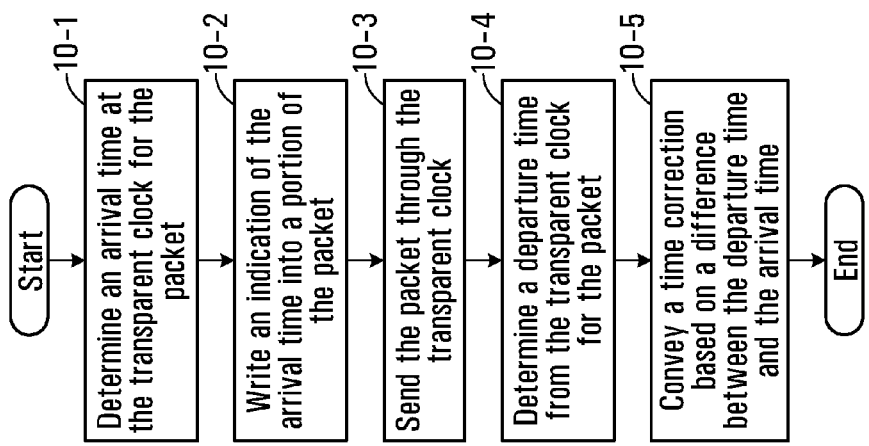

Referring now to FIG. 10, shown is a flowchart of a method of accounting for time that a packet spends in transit through a transparent clock. This method can be implemented by a transparent clock, for example by the Ingress device 35 and the Egress device 36 of the transparent clock 33 shown in FIG. 3. Alternatively, this method can be implemented by any respective pair of Ingress PHY device 55a,56a,75a,85a,95a and Egress PHY device 56a,66a,76a,86a,96a of the transparent clocks 53,63,73,83,93 shown in FIGS. 5 through 9. More generally, this method can be implemented by appropriately configured Ingress and Egress portions of a transparent clock.

At step 10-1, the Ingress portion determines an arrival time $t_A$ at the transparent clock for the packet. In accordance with an embodiment of the disclosure, at step 10-2 the Ingress portion writes an indication of the arrival time $t_A$ into a portion of the packet before sending the packet through the transparent clock at step 10-3. The packet is received by the Egress portion, which determines a departure time $t_D$ from the transparent clock for the packet at step 10-4. Finally, at step 10-5, the Egress portion conveys a time correction based on a difference between the departure time $t_D$ and the arrival time $t_A$. Thus there is an accounting for time that the packet spends in transit through the transparent clock.

There are many ways that the Ingress portion can write the indication of the arrival time $t_A$ into the packet. In some implementations, the Ingress portion writes the indication of the arrival time $t_A$ into a header of the packet. In further implementations, the Ingress portion writes 32-LSB (least significant bits) of a timestamp into a 32-bit field of the header that is not used for any other function. Example details of such implementations have already been provided with reference to FIGS. 3 through 7 and are thus not repeated here. In alternative implementations, the Ingress portion writes the indication of the arrival time $t_A$ into a preamble or an FCS (frame check sequence) of the packet. Example details of such implementations have been provided above with reference to FIG. 8 and are thus not repeated here.

There are many ways that the Egress portion can convey the time correction. The way in which the Egress portion conveys the time correction can vary depending on whether the one-step mode or the two-step mode is being utilized. In some implementations, for the one-step mode the Egress portion determines the departure time $t_D$, calculates the time correction, and writes the time correction into the packet prior to the packet leaving the transparent clock. Example details of such implementations have been provided above with reference to FIG. 5 and are thus not repeated here. In some implementations, for two-step mode the Egress portion relies on an NPU to calculate the time correction. Example details of such implementations have been provided above with reference to FIGS. 6 and 7 and are thus not repeated here.

Second Example Method

Figure 11:
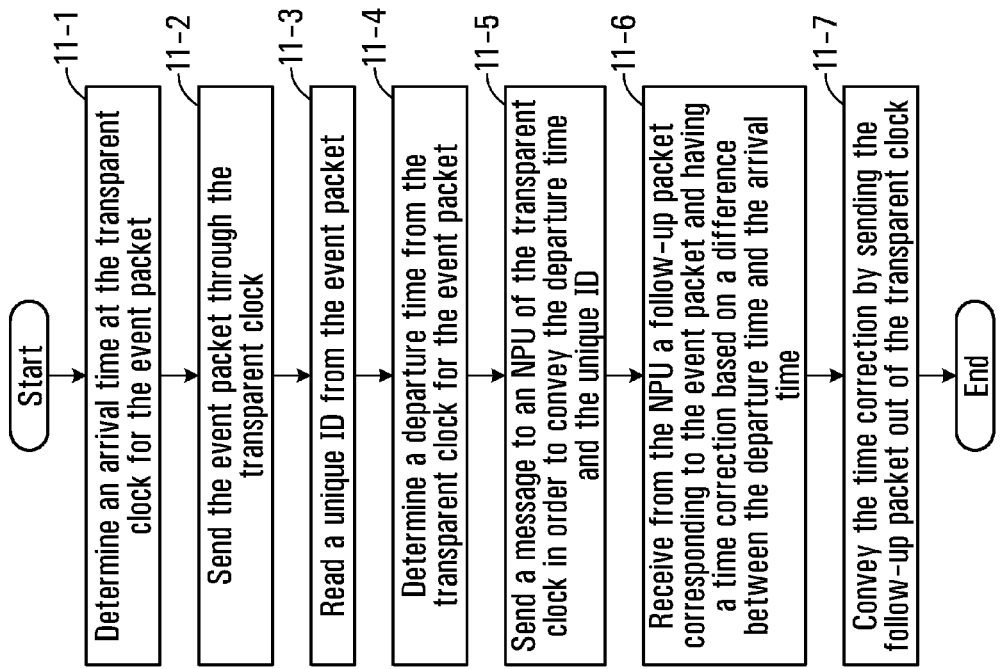
FIGS. 10 through 12 are flowcharts of methods of accounting for time that a packet spends in transit through a transparent clock.

Referring now to FIG. 11, shown is a flowchart of another method of accounting for time that an event packet spends in transit through a transparent clock. This method can be implemented by a transparent clock, for example by any respective pair of Ingress PHY device 55a,65a,75a,85a,95a and Egress PHY device 56a,66a,76a,86a,96a of the transparent clocks 53,63,73,83,93 shown in FIGS. 5 through 9. More generally, this method can be implemented by appropriately configured Ingress and Egress portions of a transparent clock.

At step 11-1, the Ingress portion determines an arrival time $t_A$ at the transparent clock for the event packet. In some implementations, the Ingress portion writes into the event packet an indication of the arrival time $t_A$. At step 11-2, the Ingress portion sends the event packet through the transparent clock. The event packet traverses an NPU in the transparent clock, which determines the arrival time $t_A$ for example by reading the indication of the arrival time $t_A$ from the event packet. In alternative implementations, the arrival time $t_A$ is conveyed to the NPU by other means, for example via separate message sent from the Ingress portion. The NPU forwards the event packet with a unique ID associated with the event packet. The unique ID is later used to reconcile a follow-up packet with the event packet and its departure time $t_D$.

The event packet is received by the Egress portion, which reads the unique ID from the event packet at step 11-3. The event packet is forwarded out of the transparent clock, and the Egress portion determines its departure time $t_D$ at step 11-4. At step 11-5, the Egress portion sends a message to the NPU in order to convey the departure time $t_D$ and the unique ID. The NPU uses the unique ID to reconcile the departure time $t_D$ with the arrival time $t_A$ that it previously determined. Thus, the NPU can calculate a time correction based on a difference between the departure time $t_D$ and the arrival time $t_A$. The NPU writes the time correction into a follow-up packet and sends the same to the Egress portion.

The follow-up packet is received by the Egress portion at step 11-6. At step 11-7, the Egress portion conveys the time correction by sending the follow-up packet with the time correction out of the transparent clock. Thus there is an accounting for time that the event packet spends in transit through the transparent clock.

Figure 12:
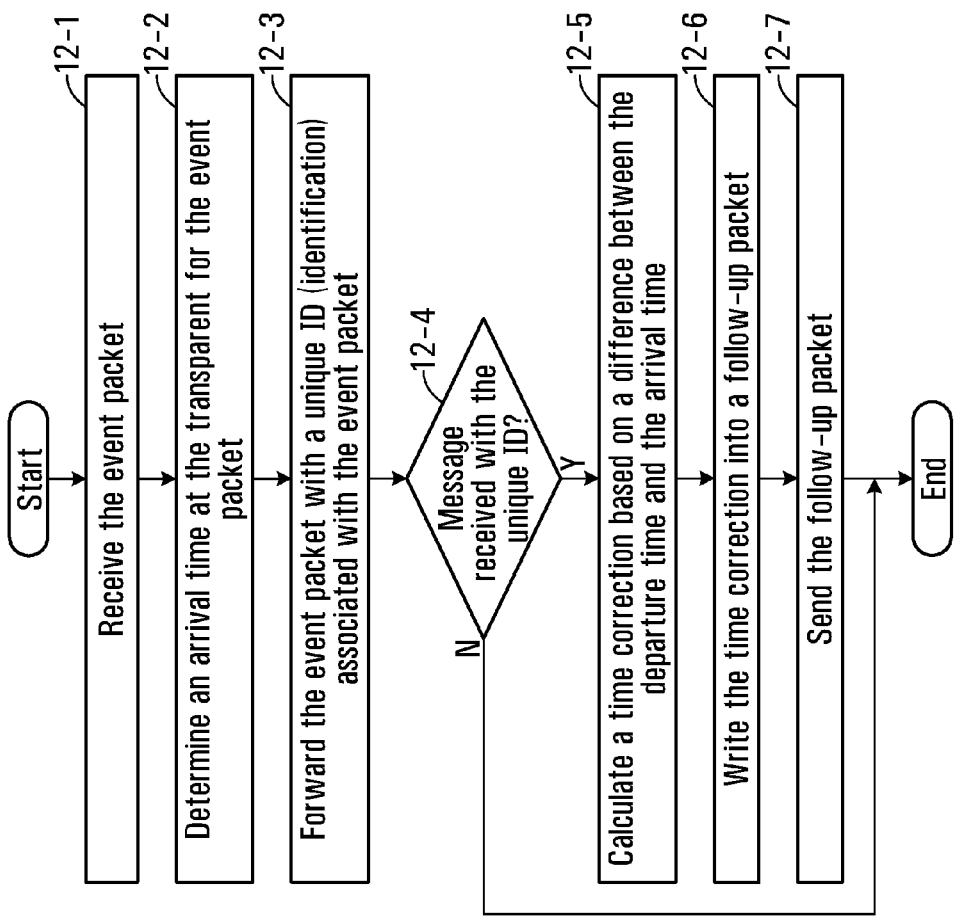

Referring now to FIG. 12, shown is a flowchart of a corresponding method of accounting for time that an event packet spends in transit through a transparent clock. This method can be implemented by a transparent clock, for example by any of the Egress NPUs 56b,66b,76b,86b,96b of the transparent clocks 53,63,73,83,93 shown in FIGS. 5 through 9. Alternatively, this method can be implemented by an Ingress NPU. More generally, this method can be implemented by any appropriately configured NPU of a transparent clock. This method is similar to the method described above with reference to FIG. 11, but from the perspective of the NPU.

After the event packet is received and processed by the Ingress portion as described above, it is received by the NPU at step 12-1. At step 12-2, the NPU determines an arrival time $t_A$ at the transparent clock, for example by reading an indication of the arrival time $t_A$ from the event packet. In alternative implementations, the arrival time $t_A$ is conveyed to the NPU by other means, for example via separate message sent from the Ingress portion. At step 12-3, the NPU forwards the event packet with a unique ID associated with the event packet. The unique ID is later used to reconcile a follow-up packet with the event packet and its departure time $t_D$. The NPU might for example store the arrival time $t_A$ with the unique ID in a FIFO. The event packet is then processed by the Egress portion as described above.

Upon receiving a message having a departure time $t_D$ from the transparent clock, if at step 12-4 the message comprises the unique ID, then at step 12-5 the NPU calculates a time correction based on a difference between the departure time $t_D$ and the arrival time $t_A$. Subsequently, the NPU writes the time correction into a follow-up packet at step 12-6 and then sends the follow-up packet at step 12-7. The follow-up packet is received and processed by the Egress portion as described above.

For the methods described above with reference to FIGS. 11 and 12, there are many ways that the indication of the arrival time $t_A$ of the event packet can be conveyed from the Ingress portion to the Egress portion. In some implementations, the Ingress portion writes into the event packet an indication of the arrival time $t_A$. In further implementations, the indication of the arrival time $t_A$ is written into a header of the event packet. In specific implementations, 32-LSB (least significant bits) of a timestamp is written into a 32-bit field of the header that is not used for any other function. Example details of such implementations have already been provided with reference to FIGS. 3 through 7 and are thus not repeated here. In alternative implementations, the indication of the arrival time $t_A$ is written into a preamble or an FCS (frame check sequence) of the packet. Example details of such implementations have been provided above with reference to FIG. 8 and are thus not repeated here. In other alternative implementations, the indication of the arrival time $t_A$ is conveyed by a separate message.

Clauses

Further aspects of the present disclosure are defined in the clauses trailing below.

clause 1. An apparatus configured to account for time that an event packet spends in transit through a transparent clock, the apparatus comprising:
  an Ingress portion configured for:
    (i) determining an arrival time at the transparent clock for the event packet; and
    (ii) sending the event packet through the transparent clock; and
  an Egress portion configured for:
    (i) reading a unique ID (identification) from the event packet;
    (ii) determining a departure time from the transparent clock for the event packet;
    (iii) sending a message to an NPU (network processing unit) of the transparent clock, the message conveying the departure time and the unique ID;
    (iv) receiving a follow-up packet from the NPU, the follow-up packet corresponding to the event packet and comprising a time correction based on a difference between the departure time and the arrival time; and
    (v) conveying the time correction by sending the follow-up packet out of the transparent clock.

clause 2. The apparatus of clause 1, wherein the Ingress portion is further configured for:
  writing the indication of the arrival time into a portion of the event packet before sending the event packet through the transparent clock.

clause 3. The apparatus of clause 2, wherein the Ingress portion is configured for writing the indication of the arrival time into the portion of the event packet by:
  writing the indication of the arrival time into a header of the event packet.

clause 4. The apparatus of clause 3, wherein the Ingress portion is configured for writing the indication of the arrival time into the header of the event packet by:
  writing 32-LSB (least significant bits) of a timestamp into a 32-bit field of the header that is not used for any other function.

clause 5. The apparatus of clause 2, wherein the Ingress portion is configured for writing the indication of the arrival time into the portion of the event packet by:
  writing the indication of the arrival time into a preamble or an FCS (frame check sequence) of the event packet.

clause 6. The apparatus of clause 1, wherein the Ingress portion and the Egress portion are separate devices forming part of the transparent clock.

clause 7. The apparatus of clause 6, wherein the separate devices have identical configurations, the Ingress portion being an Ingress PHY (physical layer) and the Egress portion being an Egress PHY.

clause 8. The apparatus of clause 1, wherein the event packet is any one of a synchronisation packet, a delay request packet, a peer delay request packet, and a peer delay response packet.

clause 9. The apparatus of clause 1, wherein:
  the follow-up packet originates from outside of the transparent clock and comprises any initial correction from outside of the transparent clock; and
  the time correction comprises any initial correction from outside of the transparent clock plus the difference between the departure time and the arrival time.

clause 10. The apparatus of clause 1, wherein:
  the follow-up packet originates from inside the transparent clock; and
  the time correction comprises the difference between the departure time and the arrival time.

clause 11. The apparatus of clause 10, wherein:
  the event packet comprises any initial correction from outside of the transparent clock; and
  the Egress portion is further configured for conveying any initial correction from outside of the transparent clock by sending the event packet out of the transparent clock.

clause 12. The apparatus of clause 1, wherein the transparent clock is configured to operate as a master or a slave to another clock, the Egress portion being configured for:
  upon receiving an event packet from an NPU (network processing unit) of the transparent clock, if the event packet has an indication to insert a timestamp into the event packet before the event packet leaves the transparent clock:
    (i) inserting a timestamp into the event packet; and
    (ii) sending the event packet to the other clock.

clause 13. The apparatus of clause 12, wherein the indication to insert the timestamp is an indicative encoding in an existing field.

clause 14. The apparatus of clause 13, wherein the indicative encoding in the existing field is a predetermined negative number written in a correctionField relating to time correction for packet transit.

clause 15. The Egress portion of clause 14, wherein the Egress portion is further configured for resetting the correctionField before sending the event packet to the slave clock.

clause 16. A method of accounting for time that an event packet spends in transit through a transparent clock, the method comprising:
  determining an arrival time at the transparent clock for the event packet;
  sending the event packet through the transparent clock;
  reading a unique ID (identification) from the event packet;
  determining a departure time from the transparent clock for the event packet;
  sending a message to an NPU (network processing unit) of the transparent clock, the message conveying the departure time and the unique ID;
  receiving a follow-up packet from the NPU, the follow-up packet corresponding to the event packet and comprising a time correction based on a difference between the departure time and the arrival time; and
  conveying the time correction by sending the follow-up packet out of the transparent clock.

clause 17. An apparatus configured to account for time that an event packet spends in transit through a transparent clock, the apparatus comprising:
  means for determining an arrival time at the transparent clock for the event packet;
  means for sending the event packet through the transparent clock;
  means for reading a unique ID (identification) from the event packet;
  means for determining a departure time from the transparent clock for the event packet;
  means for sending a message to an NPU (network processing unit) of the transparent clock, the message conveying the departure time and the unique ID;
  means for receiving a follow-up packet from the NPU, the follow-up packet corresponding to the event packet and comprising a time correction based on a difference between the departure time and the arrival time; and
  means for conveying the time correction by sending the follow-up packet out of the transparent clock.

clause 18. An NPU (network processing unit) configured to account for time that an event packet spends in transit through a transparent clock by:

determining an arrival time at the transparent clock for the event packet;

forwarding the event packet with a unique ID (identification) associated with the event packet;

upon receiving a message comprising a departure time from the transparent clock, if the message comprises the unique ID:
(i) calculating a time correction based on a difference between the departure time and the arrival time;
(ii) writing the time correction into a follow-up packet; and
(iii) sending the follow-up packet.

clause 19. The NPU of clause 18, wherein the NPU is configured for determining the arrival time at the transparent clock for the event packet by:

reading from the event packet an indication of the arrival time at the transparent clock.

clause 20. The NPU of clause 19, wherein the NPU is configured for reading from the event packet the indication of the arrival time at the transparent clock by:

reading from a header of the event packet the indication of the arrival time at the transparent clock.

clause 21. The NPU of clause 20, wherein the NPU is configured for reading from the header of the event packet the indication of the arrival time at the transparent clock by:

reading from a 32-bit field that is not used for any other function.

clause 22. The NPU of clause 19, wherein the NPU is configured for reading from the event packet the indication of the arrival time at the transparent clock by:

reading from a preamble or an FCS (frame check sequence) of the event packet the indication of the arrival time at the transparent clock.

clause 23. The NPU of clause 18, wherein:

the follow-up packet originates from outside of the transparent clock and comprises any initial correction from outside of the transparent clock; and the NPU is configured for calculating the time correction by adding any initial correction from outside of the transparent clock to the difference between the departure time and the arrival time.

clause 24. The NPU of clause 18, wherein:

the NPU is configured for generating the follow-up packet; and the NPU is configured for calculating the time correction by calculating the difference between the departure time and the arrival time.

clause 25. The NPU of clause 24, wherein:

the event packet comprises any initial correction from outside of the transparent clock; and the NPU is further configured for conveying any initial correction from outside of the transparent clock by sending the event packet out of the transparent clock.

clause 26. The NPU of clause 24, wherein the NPU is further configured for:

reading from the event packet a timestamp other than the arrival time;

storing the timestamp; and upon generating the follow-up message, writing the timestamp into the follow-up packet.

clause 27. The NPU of clause 18, wherein the NPU forms part of the transparent clock and is configured to operate as a master or a slave to another clock, the NPU being configured for:

generating and sending an event packet with an indication for an Egress portion of the transparent clock to insert a timestamp into the event packet before the event packet leaves the transparent clock for the other clock.

clause 28. The NPU of clause 18, wherein the indication to insert the timestamp is an indicative encoding in an existing field of the event packet.

clause 29. The NPU of clause 28, wherein the indicative encoding in the existing field is a predetermined negative number written in a correctionField relating to time correction for packet transit.

clause 30. A method of accounting for time that an event packet spends in transit through a transparent clock, the method comprising:

determining an arrival time at the transparent clock for the event packet;

forwarding the event packet with a unique ID (identification) associated with the event packet;

upon receiving a message comprising a departure time from the transparent clock, if the message comprises the unique ID:
(i) calculating a time correction based on a difference between the departure time and the arrival time; and
(ii) writing the time correction into a follow-up packet; and
(iii) sending the follow-up packet.

clause 31. The method of clause 30, wherein determining the arrival time at the transparent clock for the event packet comprises:

reading from the event packet an indication of the arrival time at the transparent clock.

clause 32. The method of clause 31, wherein reading from the event packet the indication of the arrival time at the transparent clock comprises:

reading from a header of the event packet the indication of the arrival time at the transparent clock.

clause 33. The method of clause 32, wherein reading from the header of the event packet the indication of the arrival time at the transparent clock comprises:

reading from a 32-bit field that is not used for any other function.

clause 34. The method of clause 31, wherein reading from the event packet the indication of the arrival time at the transparent clock comprises:

reading from a preamble or an FCS (frame check sequence) of the event packet the indication of the arrival time at the transparent clock.

clause 35. An NPU (network processing unit) configured to account for time that an event packet spends in transit through a transparent clock, the NPU comprising:

means for determining an arrival time at the transparent clock for the event packet;

means for forwarding the event packet with a unique ID (identification) associated with the event packet;

means for, upon receiving a message comprising a departure time from the transparent clock, if the message comprises the unique ID:
(i) calculating a time correction based on a difference between the departure time and the arrival time;
(ii) writing the time correction into a follow-up packet; and
(iii) sending the follow-up packet.

Extra Clauses

Further aspects of the present disclosure are defined in the extra clauses trailing below.

clause 36. An NPU (network processing unit) of a transparent clock configured to operate as a master or a slave to another clock, the NPU being configured for:

generating and sending an event packet with an indication for an Egress portion of the transparent clock to insert a timestamp into the event packet before the event packet leaves the transparent clock for the other clock.

clause 37. The NPU of clause 36, wherein the indication to insert the timestamp is an indicative encoding in an existing field of the event packet.

clause 38. The NPU of clause 37, wherein the indicative encoding in the existing field is a predetermined negative number written in a correctionField relating to time correction for packet transit.

clause 39. A method for execution by an NPU (network processing unit) of a transparent clock configured to operate as a master or a slave to another clock, the method comprising:
  generating and sending an event packet with an indication for an Egress portion of the transparent clock to insert a timestamp into the event packet before the event packet leaves the transparent clock for the other clock.

clause 40. An Egress portion of a transparent clock configured to operate as a master or a slave to another clock, the Egress portion being configured for:
  upon receiving an event packet from an NPU (network processing unit) of the transparent clock, if the event packet has an indication to insert a timestamp into the event packet before the event packet leaves the transparent clock:
    (i) inserting a timestamp into the event packet; and
    (ii) sending the event packet to the other clock.

clause 41. The Egress portion of clause 40, wherein the indication to insert the timestamp is an indicative encoding in an existing field.

clause 42. The Egress portion of clause 41, wherein the indicative encoding in the existing field is a predetermined negative number written in a correctionField relating to time correction for packet transit.

clause 43. The Egress portion of clause 42, wherein the Egress portion is further configured for resetting the correctionField before sending the event packet to the other clock.

clause 44. The Egress portion of clause 40, wherein the Egress portion is an Egress PHY (physical layer).

clause 45. A method for execution by an Egress portion of a transparent clock configured to operate as a master or a slave to another clock, the method comprising:
  upon receiving an event packet from an NPU (network processing unit) of the transparent clock, if the event packet has an indication to insert a timestamp into the event packet before the event packet leaves the transparent clock:
    (i) inserting a timestamp into the event packet; and
    (ii) sending the event packet to the other clock.

Combination of Applications

Whilst several different application examples have been separately described above, it is to be understood that functionality from any appropriate combination of the application examples can be implemented in one transparent clock. For example, a transparent clock might support (1) the one-step mode of FIG. 5, (2) the two-step mode of FIGS. 6A and 6B, and (3) the other mode of FIG. 9. Alternatively, a transparent clock might support (1) the two-step mode of FIGS. 6A and 6B, (2) the master-slave mode of FIG. 8, and (3) the other mode of FIG. 9. Other combinations of modes supported by a transparent clock are possible are within the scope of the disclosure.

Numerous modifications and variations of the present disclosure are possible in light of the above teachings. It is therefore to be understood that within the scope of the appended claims, the disclosure may be practised otherwise than as specifically described herein.

We claim:

1. An apparatus configured to account for time that an event packet spends in transit through a transparent clock, the apparatus comprising:
  an Ingress portion comprising:
    an input for receiving the event packet;
    circuitry configured to determine an arrival time at the transparent clock for the event packet; and
    an output for sending the event packet through the transparent clock; and
  an Egress portion comprising:
    an input for receiving the event packet in which a unique ID (identification) has been inserted by an NPU (network processing unit) of the transparent clock;
    circuitry configured to read the unique ID from the event packet and to determine a departure time from the transparent clock for the event packet;
    an output for sending the event packet out of the transparent clock;
    wherein the circuitry is further configured to send a message to the NPU for conveying the departure time and the unique ID;
    wherein the circuitry is further configured such that, upon receiving from the NPU a follow-up packet corresponding to the event packet and comprising a time correction based on a difference between the departure time and the arrival time, the circuitry conveys the time correction by sending the follow-up packet out of the transparent clock;
  wherein the transparent clock is configured to operate as a master or a slave to another clock, the Egress portion being configured to:
    upon receiving an event packet from the NPU, if the event packet has an indication to insert a timestamp into the event packet before the event packet leaves the transparent clock:
      (i) insert a timestamp into the event packet; and
      (ii) send the event packet to the other clock;
    wherein the indication to insert the timestamp comprises a predetermined negative number written in a correctionField relating to time correction for packet transit.

2. The apparatus of claim 1, wherein the circuitry of the Egress portion is configured to send the message to the NPU for use in calculating the difference between the departure time and the arrival time.

3. The apparatus of claim 1, wherein the Ingress portion is further configured to:
  write the indication of the arrival time into a portion of the event packet before sending the event packet through the transparent clock.

4. The apparatus of claim 3, wherein the Ingress portion is configured to write the indication of the arrival time into the portion of the event packet by:
  writing the indication of the arrival time into a header of the event packet.

5. The apparatus of claim 4, wherein the Ingress portion is configured to write the indication of the arrival time into the header of the event packet by:
  writing 32-LSB (least significant bits) of a timestamp into a 32-bit field of the header that is not used for any other function.

6. The apparatus of claim 3, wherein the Ingress portion is configured to write the indication of the arrival time into the portion of the event packet by:
  writing the indication of the arrival time into a preamble or an FCS (frame check sequence) of the event packet.

7. The apparatus of claim 1, wherein the Ingress portion and the Egress portion are separate devices forming part of the transparent clock.

8. The apparatus of 7, wherein the separate devices have identical configurations, the Ingress portion being an Ingress PHY (physical layer) and the Egress portion being an Egress PHY.

9. The apparatus of claim 1, wherein the event packet is any one of a synchronisation packet, a delay request packet, a peer delay request packet, and a peer delay response packet.

10. The apparatus of claim 1, wherein:
the follow-up packet originates from outside of the transparent clock and comprises any initial correction from outside of the transparent clock; and
the time correction comprises any initial correction from outside of the transparent clock plus the difference between the departure time and the arrival time.

11. The apparatus of claim 1, wherein:
the follow-up packet originates from inside the transparent clock; and
the time correction comprises the difference between the departure time and the arrival time.

12. The apparatus of claim 11, wherein:
the event packet comprises any initial correction from outside of the transparent clock; and
the Egress portion is further configured to convey any initial correction from outside of the transparent clock by sending the event packet out of the transparent clock.

13. The apparatus of claim 1, wherein the Egress portion is further configured to reset the correctionField before sending the event packet to the slave clock.

14. The apparatus of claim 1, wherein the indication to insert the timestamp further comprises a flag in an LSB portion of the correctionField.

15. The apparatus of claim 14, wherein the Egress portion is further configured to reset the correctionField before sending the event packet to the slave clock.

16. The apparatus of claim 1, wherein the circuitry of the Egress portion is configured to read the unique ID from the event packet by reading a header of the event packet.

17. The apparatus of claim 16, wherein the circuitry of the Egress portion is configured to read the unique ID from the header by reading a reserved field that has not assigned for any other function.

18. The apparatus of claim 17, wherein the circuitry of the Egress portion is configured to read the unique ID from the reserved field by reading an LSB portion of the reserved field.

19. The apparatus of claim 17, wherein the circuitry of the Egress portion is configured to determine whether the event packet has the unique ID by reading a portion of the reserved field that indicates presence of the unique ID.

20. The apparatus of claim 19, wherein the portion of the reserved field comprises a bit that flags extraction of the unique ID from the reserved field.

21. The apparatus of claim 1, wherein the circuitry of the Egress portion is configured to send the message to the NPU to write the departure time and the unique ID into a timestamp extraction FIFO (first in first out) of the NPU.

* * * * *